(12) United States Patent
Shimada et al.

(10) Patent No.: US 11,841,491 B2
(45) Date of Patent: Dec. 12, 2023

(54) OBSERVATION VESSEL, SAMPLE PREPARATION METHOD, AND OBSERVATION METHOD

(71) Applicant: Evident Corporation, Nagano (JP)

(72) Inventors: Yoshihiro Shimada, Tokyo (JP); Chihiro Hiraga, Tokyo (JP); Katsunori Ogo, Tokyo (JP); Daisuke Nishiwaki, Tokyo (JP); Takashi Sugiyama, Tokyo (JP)

(73) Assignee: Evident Corporation, Nagano (JP)

( * ) Notice: Subject to any disclaimer, the term of this patent is extended or adjusted under 35 U.S.C. 154(b) by 247 days.

(21) Appl. No.: 17/327,891

(22) Filed: May 24, 2021

(65) Prior Publication Data

US 2021/0373312 A1    Dec. 2, 2021

(30) Foreign Application Priority Data

May 26, 2020    (JP) .................. 2020-091643

(51) Int. Cl.
*G02B 21/06* (2006.01)
*G02B 21/34* (2006.01)
*G02B 21/00* (2006.01)

(52) U.S. Cl.
CPC ......... *G02B 21/06* (2013.01); *G02B 21/0076* (2013.01); *G02B 21/34* (2013.01)

(58) Field of Classification Search
CPC .... G02B 21/06; G02B 21/0076; G02B 21/34; B01L 3/50825; B01L 2300/047; B01L 2300/0654; B01L 2300/0829; B01L 2300/0838; B01L 3/50857

USPC ........................................... 359/385
See application file for complete search history.

(56) References Cited

U.S. PATENT DOCUMENTS

| | | | |
|---|---|---|---|
| 10,895,728 B2 | 1/2021 | Shimada et al. | |
| 10,996,454 B2 | 5/2021 | Shimada | |
| 2007/0042490 A1* | 2/2007 | Welter | C12M 21/08 435/325 |
| 2016/0070091 A1 | 3/2016 | Hufnagel et al. | |
| 2017/0087547 A1* | 3/2017 | Laukkonen | A61B 5/150343 |
| 2018/0196247 A1 | 7/2018 | Hufnagel et al. | |
| 2018/0361377 A1* | 12/2018 | Brinkman | G01N 21/8806 |
| 2019/0136180 A1 | 5/2019 | Ogo | |
| 2019/0146203 A1* | 5/2019 | Shimada | G02B 21/33 359/368 |
| 2019/0184400 A1 | 6/2019 | Ogo | |
| 2019/0185901 A1 | 6/2019 | Ogo | |
| 2020/0233197 A1 | 7/2020 | Hufnagel et al. | |

FOREIGN PATENT DOCUMENTS

JP    2016517971 A    6/2016

* cited by examiner

*Primary Examiner* — Balram T Parbadia
*Assistant Examiner* — Rahman Abdur
(74) *Attorney, Agent, or Firm* — Holtz, Holtz & Volek PC

(57) ABSTRACT

An observation vessel includes a holding portion configured to hold an observation object and an accommodation portion at least partially formed of a transparent curved surface and configured to position the holding portion. The holding portion is configured to hold the observation object at a set position separated from the curved surface toward a center of curvature of the curved surface in a first state of being positioned at a first position by the accommodation portion.

18 Claims, 27 Drawing Sheets

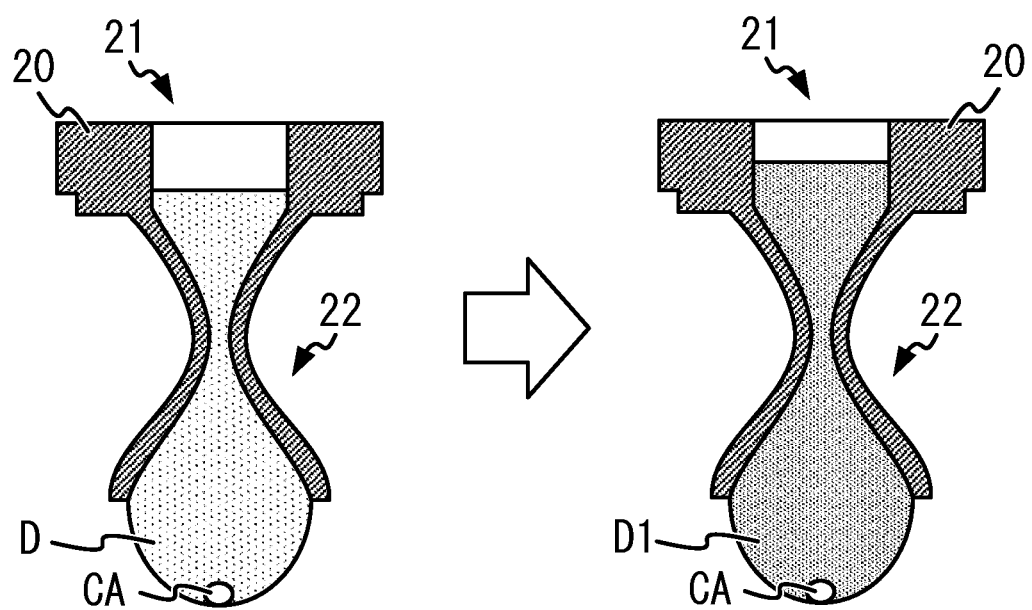
F I G. 5

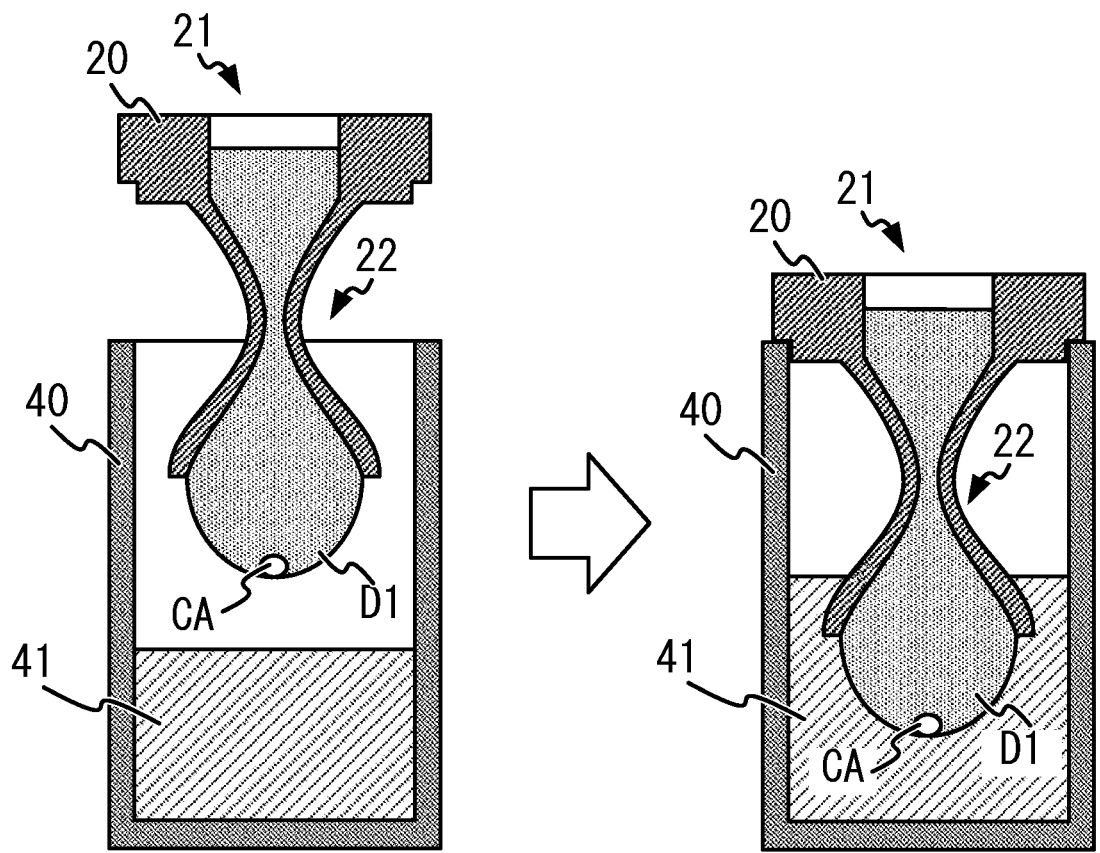
F I G. 6

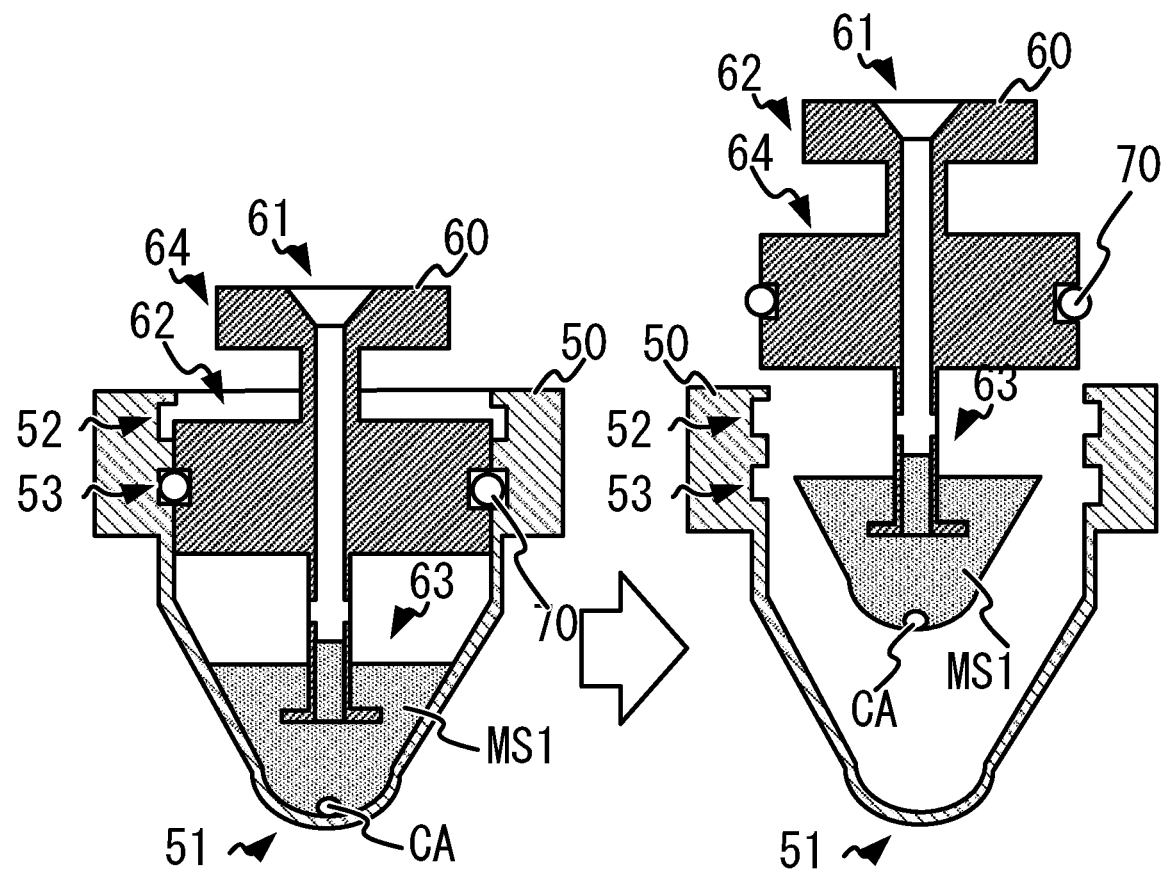
F I G. 1 4

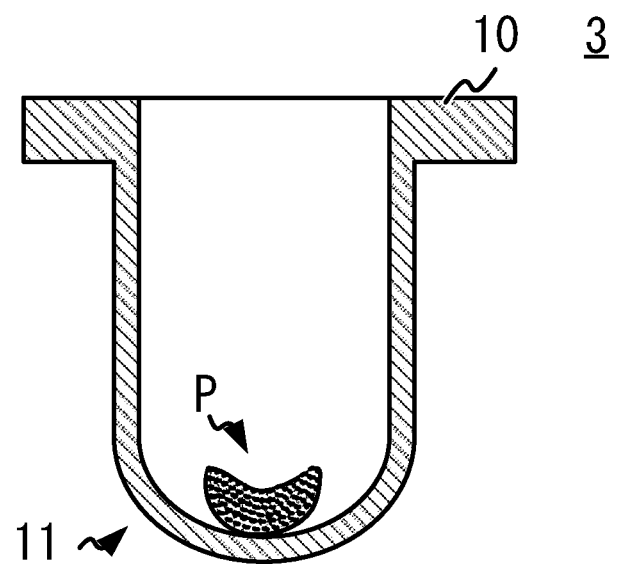
F I G. 1 7

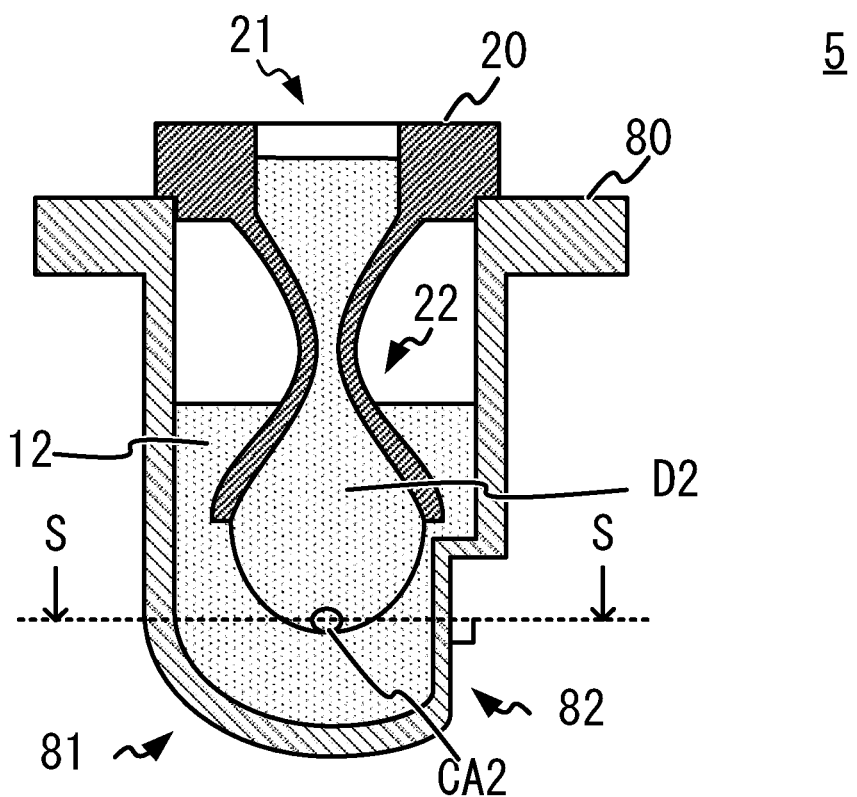
F I G. 2 3

OBSERVATION VESSEL, SAMPLE PREPARATION METHOD, AND OBSERVATION METHOD

CROSS REFERENCE TO RELATED APPLICATIONS

This application is based upon and claims the benefit of priority from prior Japanese Patent Application No. 2020-091643, filed May 26, 2020, the entire contents of which are incorporated herein by this reference.

BACKGROUND OF THE INVENTION

Field of the Invention

The present disclosure relates to an observation vessel, a sample preparation method, and an observation method.

Description of the Related Art

At present, research using cell aggregates such as spheroids or organoids which consist of a large number of cells and are three-dimensionally cultured is attracting attention. In recent years, screening for drug discovery using image analysis technology has been performed on microscopic image data acquired by imaging of spheroids or organoids with a microscope to evaluate a medicinal effect.

The above-described observation object subjected to drug discovery screening has a size of about 100 µm to 500 µm. For this reason, the microscopic image data is generally acquired in such a manner that the observation object is subjected to deep-part imaging or Z-series imaging (also referred to as Z-stack imaging) after a permeabilization to prevent scattering inside the observation object.

In addition, since the drug discovery screening is required to efficiently screen a large number of observation objects, a microscope capable of high-speed imaging such as disk-type confocal inverted microscope is used. A light sheet microscope suitable for deep-part observation may be used (see published Japanese translation of PCT application No. 2016-517971). In either case, it is essential to use a liquid-immersion objective lens having a high numerical aperture in order to achieve high resolution and efficiently collect the generated observation light to shorten an exposure time.

SUMMARY OF THE INVENTION

An observation vessel according to an aspect of the present invention includes: a holding portion configured to hold an observation object; and an accommodation portion at least partially formed of a transparent curved surface and configured to position the holding portion, the holding portion being configured to hold the observation object at a set position separated from the curved surface toward a center of curvature of the curved surface in a first state of being positioned at a first position by the accommodation portion.

A sample preparation method according to another aspect of the present invention is a sample preparation method using an observation vessel including a holding portion configured to hold an observation object and an accommodation portion at least partially formed of a transparent curved surface, the method including: positioning the holding portion at a first position by the accommodation portion; and holding the observation object at a set position separated from the curved surface toward a center of curvature of the curved surface in a first state where the holding portion is positioned at the first position.

A sample observation method according to yet another aspect of the present invention includes: holding the observation object at a set position separated from a transparent curved surface at least partially formed on an accommodation portion toward a center of curvature of the curved surface; and taking light into an objective lens from the observation object held at the set position, via the curved surface.

BRIEF DESCRIPTION OF THE DRAWINGS

FIG. 5 is a view illustrating a gelation process according to the first embodiment;

FIG. 6 is a view illustrating an immobilization/fluorescent staining process according to the first embodiment;

FIG. 14 is a view illustrating a peeling process according to the second embodiment;

FIG. 17 is a view showing a configuration of an observation vessel 3 according to a third embodiment;

FIG. 23 is a view showing a configuration of an observation vessel 5 according to a fifth embodiment;

DETAILED DESCRIPTION OF THE PREFERRED EMBODIMENTS

In a case of imaging a deep part of an observation object, an influence on spherical aberration due to a mismatch between refractive indexes of media increases. Since the influence on the spherical aberration becomes more remarkable as a numerical aperture of an objective lens is higher, it is desired to take some measures against such a problem in observation using a liquid immersion objective lens. Assuming that a permeabilization is performed, refractive indexes of media in a vessel can be considered to be substantially uniform. Therefore, when the vessel has a uniform thickness, the influence of differences between a refractive index of an immersion liquid and a refractive index of a medium (including an observation object) in the vessel is dominant in spherical aberration caused by refractive index mismatching.

The refractive index of the permeabilized observation object is considerably higher than a refractive index (1.33) of water, similarly to a refractive index of a general permeabilization solution. For this reason, from the viewpoint of preventing the refractive index mismatching, the immersion liquid is preferably oil (for example, a refractive index being 1.52) or silicone oil (for example, a refractive index being 1.40) rather than water.

On the other hand, using oil or silicone oil for the immersion liquid has an operational problem. The number of observation objects subjected to drug discovery screening is very large, and a manual supply of the immersion liquid is a heavy burden. For this reason, an automatic supply device is generally used, but when the immersion liquid is oil, bubbles are likely to be created due to its high viscosity, and the automatic supply of the immersion liquid is difficult. In addition, there is also a problem that it takes time and effort to clean the vessel to which oil is attached.

For this reason, a water-immersion objective lens is used in the current drug discovery screening with an emphasis on operational superiority rather than aberration performance. Embodiments of the present invention will be described based on the above-described circumstance.

A description will be given below with respect to an observation vessel and a sample preparation method used for observing a biological sample having a three-dimensional structure. In the description, the observation includes imaging with a digital camera without being limited to visual observation. In addition, the biological sample as an observation object is not particularly limited, but may be cell aggregates such as spheroids or organoids, for example. Embodiments will be described below by taking a case where the observation object is a cell aggregate as an example.

First Embodiment

Figure 1:
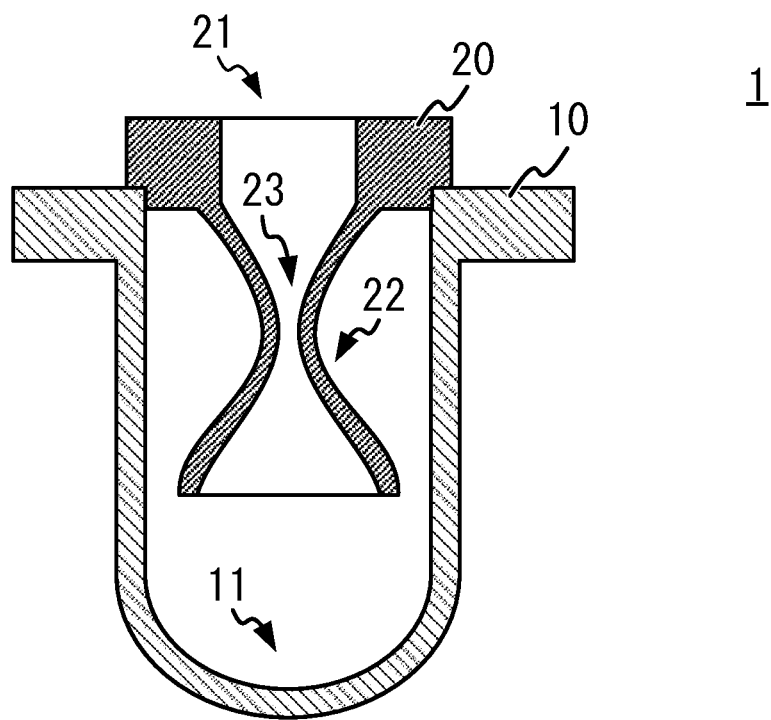
FIG. 1 is a view showing a configuration of an observation vessel 1 according to a first embodiment.
Figure 2A:
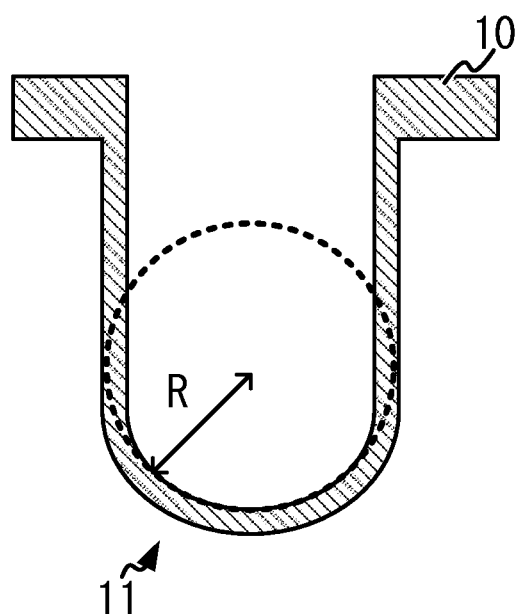
FIGS. 2A and 2B are views illustrating a shape of an accommodation portion 10.
Figure 2B:
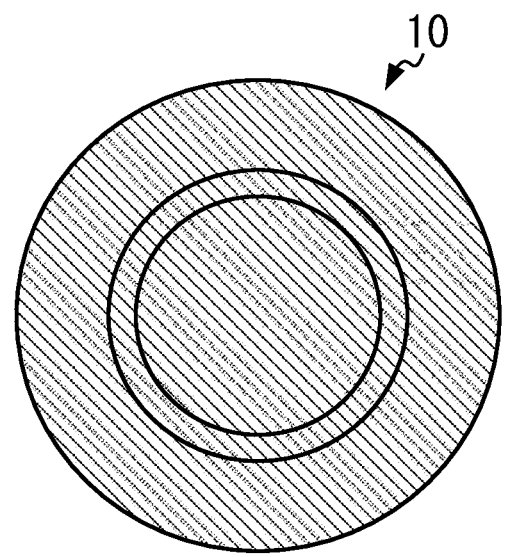

FIG. 1 is a view showing a configuration of an observation vessel 1 according to a first embodiment. FIGS. 2A and 2B are views illustrating a shape of an accommodation portion 10. As shown in FIG. 1, the observation vessel 1 includes an accommodation portion 10 that accommodates an observation object therein and a holding portion 20 that holds the observation object. A configuration of the observation vessel 1 will be described in detail below with reference to FIGS. 1 to 2B.

The accommodation portion 10 is configured to perform positioning of the holding portion 20 as shown in FIG. 1. Further, the accommodation portion 10 is at least partially formed of a transparent curved surface 11, and has a shape similar to a test tube. More specifically, the accommodation portion 10 has a cylindrical shape with one end being open and the other end being closed with the curved surface 11. The accommodation portion 10 is used in a state where an opening is directed vertically upward and the curved surface 11 is directed vertically downward. A bottom of the accommodation portion 10 formed of the curved surface 11 has a substantially uniform thickness.

The entire accommodation portion 10 may be transparent, or only the curved surface 11 may be transparent. In addition, only a part of the curved surface 11 may be transparent. In the accommodation portion 10, a region through which light incident on an objective lens during observation may be transparent, and therefore at least a part of the curved surface 11, through which the light passes, may be transparent.

FIG. 2A is a cross-sectional view of the accommodation portion 10 taken in an axial direction of the cylindrical shape, and shows a shape of the accommodation portion 10 when viewed from a side. Further, FIG. 2B is a plan view of the accommodation portion 10 when viewed from above. The curved surface 11 is a spherical surface having a predetermined curvature (1/R) as shown in FIGS. 2A and 2B. The curvature of the curved surface 11 is preferably constant, but does not necessarily have to be constant in the entire region of the curved surface 11. In addition, the curved surface 11 is preferably a three-dimensional curved surface, but is not limited to the spherical surface. A positive and a negative of the curvature are preferably equal to each other in the entire region of the curved surface 11, and the curved surface 11 preferably has a shape such that at least a center of the curvature is located in the accommodation portion 10 and therefore preferably has a shape in which the concave surface faces the inside of the accommodating portion 10.

The holding portion 20 includes a hanging drop forming portion 22 that forms a hanging drop of a medium solution pipetted from the opening 21. The hanging drop forming portion 22 is inserted into the inside of the accommodation portion 10 from an upper end opening of the accommodation portion 10 and a notch portion formed in the holding portion 20 is adjusted to engage with the opening end of the accommodation portion 10. Thereby, a position of the holding portion 20 is determined and positioned by the accommodation portion 10 at a predetermined position (hereinafter, referred to as a first position) as shown in FIG. 1. Hereinafter, the state in which the holding portion 20 is positioned at the first position by the accommodation portion 10 will be referred to as a first state. The cell aggregates being the observation object accommodated in the accommodation portion 10 are observed in a state of being confined in the hanging drop formed by the holding portion 20.

The hanging drop forming portion 22 is formed with a duct through which the medium solution passes. The hanging drop forming portion 22 has a funnel-like shape when viewed from the opening 21. The duct from the opening 21 to a narrowest portion 23 where a diameter of the duct is narrowed has a tapered shape in which the diameter of the duct is gradually narrowed, and more specifically, has an approximately conical shape. In addition, the duct from the narrowest portion 23 to an opening on a side opposite to the opening 21 has a reverse tapered shape so as to increase a surface area where the medium solution passing through the narrowest portion 23 gradually contacts with air. More specifically, the duct may be formed in the approximately conical shape, and may be formed with a three-dimensional curved surface to further moderate the increase in surface area.

Figure 3:
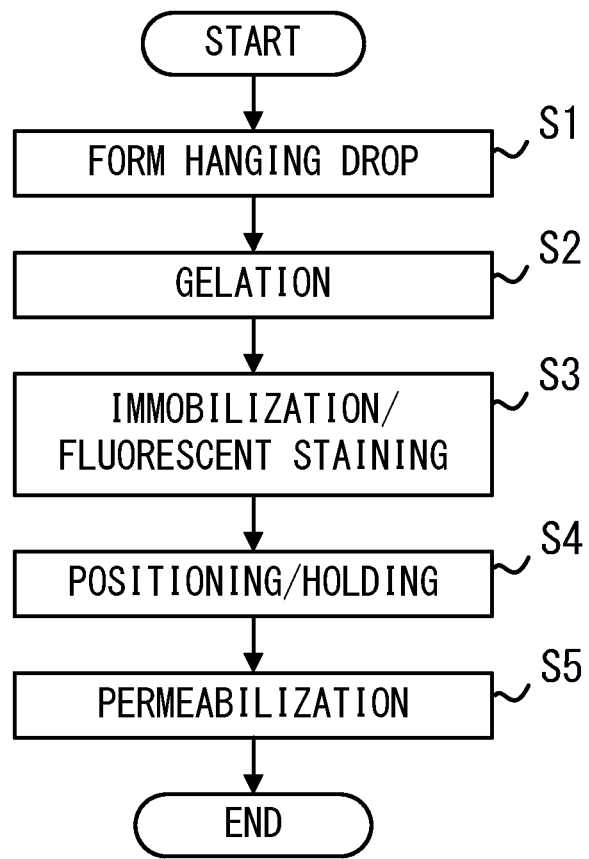
FIG. 3 is a flowchart illustrating a sample preparation method according to the first embodiment.
Figure 4:
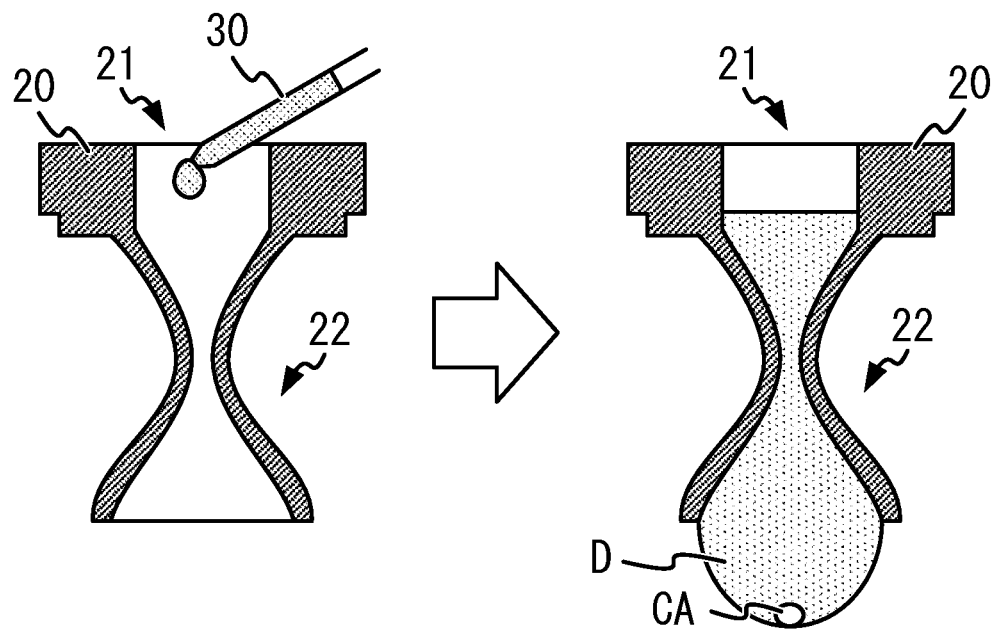
FIG. 4 is a view illustrating a hanging drop forming process according to the first embodiment.
Figure 7:
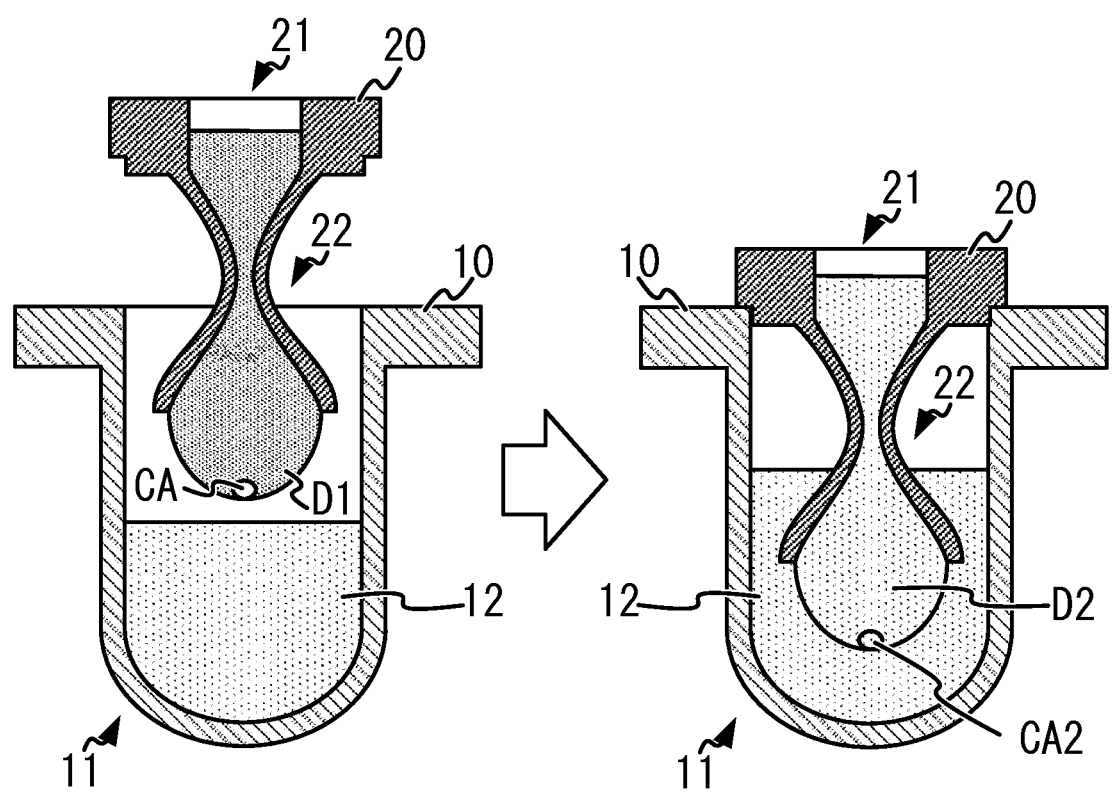
FIG. 7 is a view illustrating a permeabilization process according to the first embodiment.

FIG. 3 is a flowchart illustrating a sample preparation method according to the present embodiment. FIG. 4 is a view illustrating a hanging drop forming process according to the present embodiment. FIG. 5 is a view illustrating a gelation process according to the present embodiment. FIG. 6 is a view illustrating an immobilization/fluorescent staining process according to the present embodiment. FIG. 7 is a view illustrating a permeabilization process according to the present embodiment. A sample preparation method using the observation vessel 1 will be described below with reference to FIGS. 3 to 7.

First, a hanging drop D is formed (step S1). As shown in FIG. 4, a medium solution containing a cell aggregate CA is pipetted from the opening 21 to the holding portion 20 by a pipette 30. Thus, the hanging drop D of the medium solution is formed by the hanging drop forming portion 22. The medium solution to be pipetted is, for example, an acrylamide solution or an agarose solution. Such a solution is gelled by cooling up to a certain temperature or lower.

The cell aggregate CA pipetted with the medium solution in step S1 has a higher specific gravity than the medium solution. Therefore, in step S1, the cell aggregate CA automatically moves to a predetermined relative position with respect to the holding portion 20 and more specifically to a lowermost point of the hanging drop D by a component force of gravity acting along a liquid surface of the hanging drop D as shown in FIG. 4. In other words, the hanging drop D formed in step S1 contains the cell aggregate CA that has moved to the predetermined relative position with respect to the holding portion 20 by the component force of gravity acting along the liquid surface.

After the hanging drop D is formed and the cell aggregate CA settles at the lowermost point, the hanging drop D is gelled (step S2). Here, in a case where the medium solution constituting the hanging drop D is an acrylamide solution or an agarose solution, the hanging drop D is cooled to a gelation temperature or lower. Thus, as shown in FIG. 5, the hanging drop D (more strictly, the medium solution) is gelled, and a gel D1 is obtained in which the cell aggregate CA is embedded. The gel D1 is a gel in which the cell aggregate CA is embedded and formed by gelation of the medium solution.

Next, immobilization and fluorescent staining of the cell aggregate CA are performed (step S3). Here, as shown in FIG. 6, the gel D1 is immersed in a dedicated solution 41 filled in the vessel 40, and the cell aggregate CA contained in the gel D1 is immobilized and stained with a fluorochrome. Further, in step S3, washing of the cell aggregate CA may be performed. The fluorescent staining of the cell aggregate CA does not necessarily have to be performed after the gelation process. For example, a hanging drop is formed with a medium solution containing spheroids that is subjected to fluorescent staining in advance, and then the hanging drop may be gelled.

Thereafter, the holding portion 20 is positioned to hold the cell aggregate CA at a set position (step S4). Here, as shown in FIG. 7, the holding portion 20 is placed on the accommodation portion 10 filled with a permeabilization solution 12, and thus the holding portion 20 and the accommodation portion 10 engages with each other. Thus, the holding portion 20 is positioned at a first position by the accommodation portion 10, and the holding portion 20 holds, in a first state of being positioned at the first position, the cell aggregate CA at a set position separated from the curved surface 11 of the accommodation portion 10 toward a center of curvature of the curved surface 11. More specifically, the holding portion 20 suspends the gel D1, in which the cell aggregate CA is embedded, in an accommodation space of the accommodation portion 10, and thus holding the cell aggregate CA at the set position. The set position is at or near the center of curvature of the curved surface 11. The accommodation portion 10 and the holding portion 20 are designed in advance such that the lowermost point of the hanging drop is located near the center of curvature of the curved surface 11 in the first state where the holding portion 20 is positioned by the accommodation portion 10.

Finally, the permeabilization solution 12 permeates the gel D1 to permeabilize the cell aggregate CA (step S5). Here, as shown in FIG. 7, due to the action of the permeabilization solution 12, the gel D1 and the cell aggregate CA change into a gel D2 and a cell aggregate CA2 having a refractive index substantially equal to the refractive index of the permeabilization solution 12. Thereby, a sample is completely formed in the accommodation portion 10, the sample having a substantially uniform refractive index of the media (the permeabilization solution 12, the gel D2, and the cell aggregate CA2).

The method of gelling the hanging drop is described above, but an ultraviolet curable resin solution may be used as the medium solution constituting the hanging drop, the hanging drop may be irradiated with ultraviolet rays, for example. Thereby, the hanging drop may be solidified. Even in this case, a cell aggregate is contained in the medium solution, and a hanging drop can be obtained in which the cell aggregate is embedded. In this case, the hanging drop is a solid formed by solidification of the medium solution. Even when the solidified hanging drop is immersed in the solution, the solution is not impregnated into the hanging drop, unlike the case of the gelled hanging drop. Therefore, when the hanging drop is formed using the ultraviolet curable resin solution, it is desirable to previously perform a treatment such as fluorescent staining on the cell aggregate.

Figure 8:
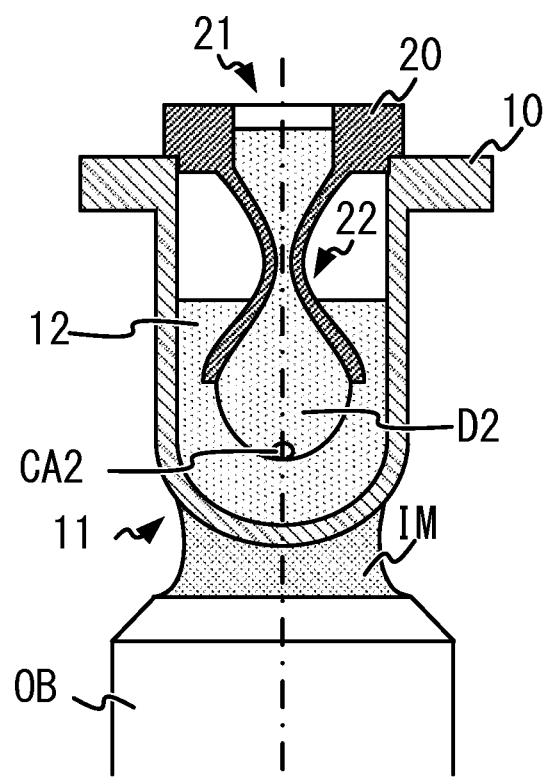
FIG. 8 is a view illustrating an observation method using an observation vessel 1 according to the first embodiment.

FIG. 8 is a view illustrating an observation method using the observation vessel 1 according to the present embodiment. FIGS. 9A to 9D are views illustrating an aberration suppression effect in the observation vessel 1. At the time of observation of the cell aggregate CA2 using the sample prepared by the procedure shown in FIG. 3, an inverted microscope is used. As a specific observation procedure, first, a sample is prepared by the procedure shown in FIG. 3, and the cell aggregate CA2 being an observation object is held at the set position described above. Thereafter, a space between the accommodation portion 10 and an objective lens OB of the inverted microscope is filled with an immersion liquid IM. Finally, as shown in FIG. 8, in the state where the space between the objective lens OB and the observation vessel 1 is filled with an immersion liquid IM, light is taken in the objective lens OB via the curved surface 11 from the cell aggregate CA2 which is held at the set position. Thereby, the cell aggregate CA2 is observed via the curved surface 11.

At the time of observation, the light rays from the cell aggregate CA2 located at the set position separated from the curved surface 11 toward the center of curvature are taken into the objective lens OB by passing through the accommodation portion 10 (curved surface 11) between the cleared medium and the immersion liquid IM. At that time, in the observation vessel 1, it is possible to make an incident angle of the light rays on the accommodation portion 10 (curved surface 11) smaller. This is because the accommodation portion 10 is formed of the curved surface 11 and the cell aggregate CA2 is separated from the curved surface 11. In particular, in a case where the set position where the cell aggregate CA2 is held is at or near the center of curvature of the curved surface 11, the incident angle can be made smaller, particularly. In this regard, a description will be given with reference to FIG. 9.

Figure 9A:
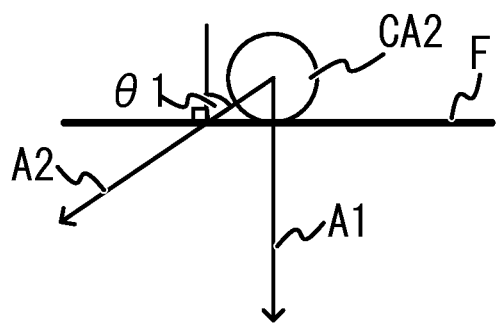
FIGS. 9A to 9D are views illustrating an aberration suppression effect in the observation vessel 1.
Figure 9B:
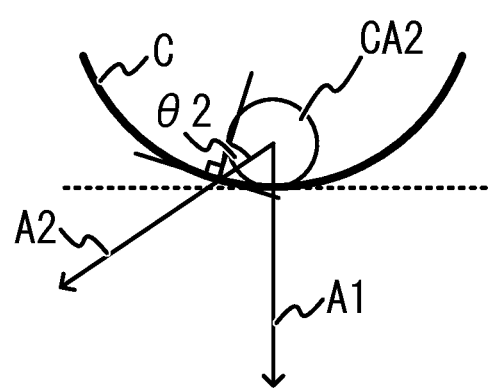
Figure 9C:
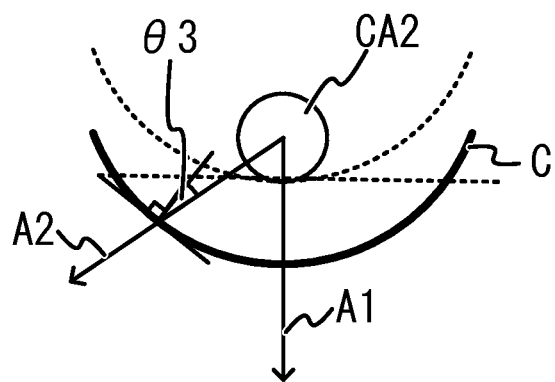
Figure 9D:
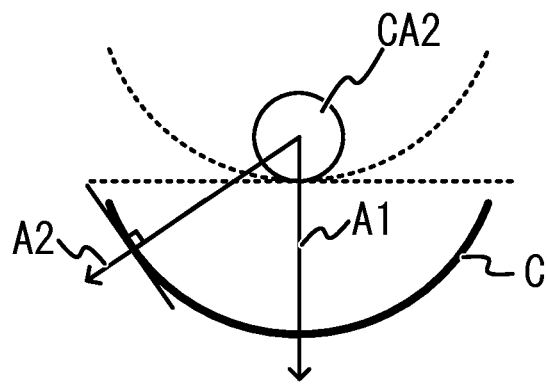

FIG. 9A shows an example in which the cell aggregate CA2 is arranged on a flat surface F. FIG. 9B shows an example in which the cell aggregate CA2 is arranged on a curved surface C. FIG. 9C shows an example in which the cell aggregate CA2 is arranged at a position separated from the curved surface C toward the center of curvature by a distance smaller than a radius of curvature. FIG. 9D shows an example in which the cell aggregate CA2 is arranged at a position separated from the curved surface C toward the center of curvature by the radius of curvature.

With reference to FIGS. 9A to 9D, a light ray A1 traveling in an optical axis direction of the objective lens is incident on a boundary surface (flat surface F, curved surface C) at an incident angle 0° in each of cases. Therefore, the light ray A1 is not refracted in any of the cases of FIGS. 9A to 9D. On the other hand, light rays A2 traveling in a direction inclined with respect to the optical axis have different incident angles on the boundary surface (flat surface F, curved surface C). Specifically, since the incident angle decreases as the state changes from FIGS. 9A to 9D, the incident angle becomes smaller in the order of FIGS. 9D to 9A (incident angle $\theta1>\theta2>\theta3>0°$).

By incidence of the light ray on the accommodation portion 10 with a small incident angle, it is possible to make a refraction angle at the accommodation portion 10 smaller. As a result, it is possible to prevent spherical aberration caused by refractive index mismatching between the media (the immersion liquid IM and the permeabilization solution) arranged with the accommodation portion 10 interposed therebetween, and to prevent deterioration of optical performance of the observation device (inverted microscope) caused by the refractive index mismatching. Accordingly, according to the observation vessel 1 and the sample preparation method of the present embodiment, it is possible to sufficiently exhibit performance of the observation device and to acquire an image with high resolution. Further, the spherical aberration can be prevented, it is possible to efficiently collect light using an objective lens sensitive to the spherical aberration and having a high numerical aperture and to obtain an image in a short time.

Further, in a case of observing a large observation object such as the cell aggregate, a permeabilization is performed to prevent scattering in the observation object, but a refractive index of a permeabilization solution now widely distributed on the market is higher than a refractive index (1.33) of water. Further, the refractive index differs depending on the type of permeabilization solution. For example, a refractive index of a permeabilization solution SCALEVIEW-S4 is 1.47, and a refractive index of a permeabilization solution CUBIC is 1.52. For this reason, it is not easy to take a measure such as an elimination of the refractive index mismatching by matching the refractive index of a liquid immersion with the refractive index of a permeabilization solution used depending on usage. However, according to the present embodiment, since the spherical aberration caused by the refractive index mismatching can be made smaller, the immersion liquid IM can be freely selected.

In particular, according to the present embodiment, for the above reason, water can be used for the immersion liquid IM, and a high-resolution image can be acquired in a short time using a water-immersion objective lens. In a case where the water with relatively low viscosity is used for the immersion liquid, bubbles are hardly created when the immersion liquid IM is supplied to the space between the observation vessel 1 and the objective lens OB, and thus the immersion liquid IM can be automatically supplied by an automatic supply device. In addition, as compared with a case where oil is used for the immersion liquid IM, there is an advantage that cleaning is not required because the water does not remain due to evaporation.

Therefore, the observation vessel 1 and the sample preparation method according to the present embodiment are suitable for automation of work and are used for usage for inspecting a large quantity of samples, for example, drug discovery screening, thereby high throughput can be realized.

In step S1 of the present embodiment, an example is described in which the cell aggregate CA, which is cultured in advance, is pipetted together with the medium solution to form the hanging drop, but the cell aggregate CA may be formed in the hanging drop. For example, the cell aggregate CA may be formed in such a manner that a culture solution, in which cells are seeded, is pipetted into the holding portion 20 to form a hanging drop and the cells gathered at the lowermost point of the hanging drop are cultured in the hanging drop. Then, the culture solution is sucked, and the medium solution is pipetted to replace components of the hanging drop with the medium solution instead of the culture solution. Even in this case, for step S2 and subsequent steps, a sample can be prepared by the same procedure as in the present embodiment.

In step S3 of the present embodiment, an example is described in which the immobilization of the cell aggregate CA is performed using the vessel 40, but the treatment of step S3 may be performed using the accommodation portion 10. For example, the gel D1 is immersed in the solution 41 contained in the accommodation portion 10, and thus the cell aggregate CA in the gel D1 may be immobilized and stained with a fluorochrome. Further, the order in which the steps shown in FIG. 3 are performed is not limited to the order shown in FIG. 3. For example, as described above, fluorescent staining may be performed before gelation.

In the above description, the cell aggregate CA is preferably positioned at the set position separated from the curved surface toward the center of curvature of the curved surface, more preferably at the set position at or near the center of curvature of the curved surface 11. However, more specifically, conditional expression (1) to be described below is preferably satisfied when a distance from the curved surface 11 to the cell aggregate CA held at the set position is defined as d and the radius of curvature of the curved surface 11 is defined as R.

$$R/2 < d < R \tag{1}$$

When the distance d is equal to the radius of curvature R, the center of curvature is located at the lowermost part of the cell aggregate CA having a thickness of about 100 μm to 500 μm. For this reason, the difference in optical performance may become too large when the lowermost part and the uppermost part of the cell aggregate CA are imaged. Therefore, the distance d is preferably less than the radius of curvature R. In addition, when the distance d is less than half of the radius of curvature R, the incident angle at which the light rays constituting a pencil of light rays from the object point in the cell aggregate CA is incident on the curved surface 11 is too large, and the refraction angle cannot be made sufficiently small. Therefore, the distance d is preferably longer than half of the radius of curvature R. When conditional expression (1) described above is satisfied, it is possible to avoid a situation in which the optical performance greatly differs depending on the position in the cell aggregate CA.

Second Embodiment

Figure 10:
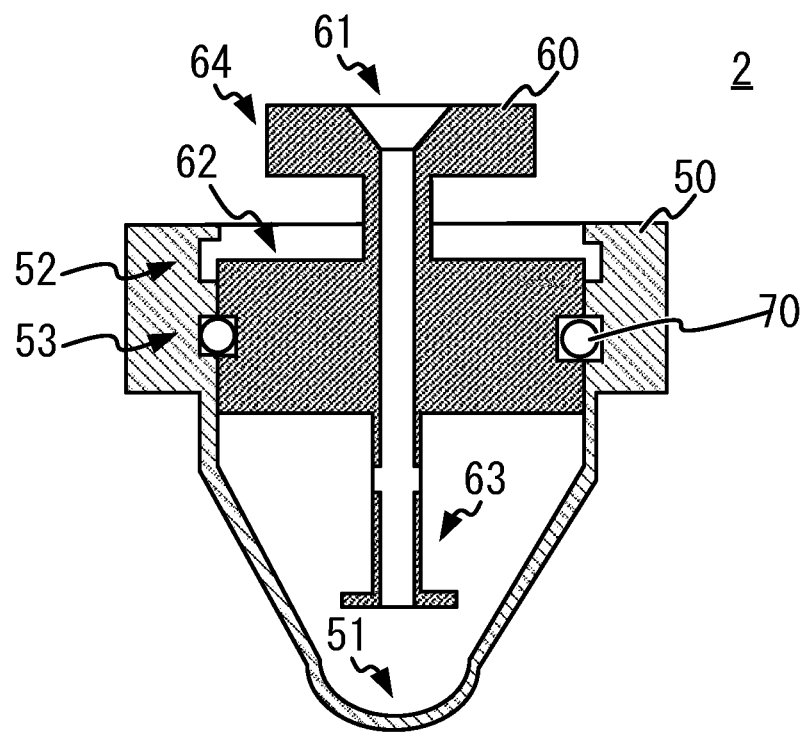
FIG. 10 is a view showing a configuration of an observation vessel 2 according to a second embodiment.

FIG. 10 is a view showing a configuration of an observation vessel 2 according to the present embodiment. As shown in FIG. 10, the observation vessel 2 includes an accommodation portion 50 that accommodates an observation object therein and a holding portion 60 that holds the observation object. The holding portion 60 is similar to the holding portion 20 according to the first embodiment in terms of holding the observation object at a set position by suspending a gel in which the observation object is embedded. The configuration of the observation vessel 2 will be described below with reference to FIG. 10.

The accommodation portion 50 is similar to the accommodation portion 10 in that at least a part thereof includes a transparent curved surface 51. The curved surface 51 is a three-dimensional curved surface forming a bottom of the accommodation portion 50, and is a spherical surface, for example. In the accommodation portion 50, a region through which light incident on an objective lens during observation may be transparent, and therefore at least a part of the curved surface 51 may be transparent. In this regard, the accommodation portion 50 is also similar to the accommodation portion 10.

The accommodation portion 50 is different from the accommodation portion 10 in that two locking portions (a locking portion 52 and a locking portion 53) are provided. The locking portion 52 is a first locking portion that positions the holding portion 60 at a first position, and the locking portion 53 is a second locking portion that positions the holding portion 60 at a second position different from the first position.

Further, the accommodation portion 50 also functions as a mold for forming a gel. Therefore, the accommodation portion 50 has a tapered shape in which a diameter of an internal space of the accommodation portion 50 is reduced toward a bottom part so that a gel can be easily peeled off in a peeling process to be described below, and is also different from the accommodation portion 10 in this regard.

The holding portion 60 also functions as a peeling portion that peels, from the curved surface 51, the gel formed on the curved surface 51 by using the accommodation portion 50 as a mold. The holding portion 60 includes a fitting portion 62 having an outer diameter substantially matching an inner diameter of the accommodation portion 50. An O-ring 70 engages with the locking portion of the accommodation portion 50, and thus the fitting portion 62 is supported by the accommodation portion 50 using the O-ring 70. As a result, the holding portion 60 is positioned by the accommodation portion 50. The O-ring 70 adheres in a state of being fitted into a groove formed in the fitting portion 62.

The holding portion 60 further includes an arm portion 63 and a grip portion 64 protruding from the fitting portion 62. The grip portion 64 extends from the fitting portion 62 so as to protrude outward from an upper opening of the accommodation portion 50 in a state where the holding portion 60 is positioned by the accommodation portion 50. On the other hand, the arm portion 63 extends from the fitting portion 62 so as to protrude toward the curved surface 51 in a state where the holding portion 60 is positioned by the accommodation portion 50. An opening 61 is formed in the grip portion 64. A duct extending from the opening 61 penetrates the fitting portion 62, the arm portion 63, and the grip portion 64.

A flange is formed near a lower end opening of the arm portion 63 to protrude in a radial direction of the duct. The flange on the arm portion 63 plays a role of lifting the gel in which the cell aggregate is embedded, as will be described below. An opening is also provided in the middle of the arm portion 63, and a liquid poured from the opening 61 is discharged to the outside through the opening provided in the middle of the arm portion 63 when the lower end opening of the arm portion 63 is closed.

The grip portion 64 is also formed with a flange protruding in the radial direction of the duct. The flange formed on the grip portion 64 is gripped by a machine or a human when the holding portion 60 slides, as will be described below.

Figure 11:
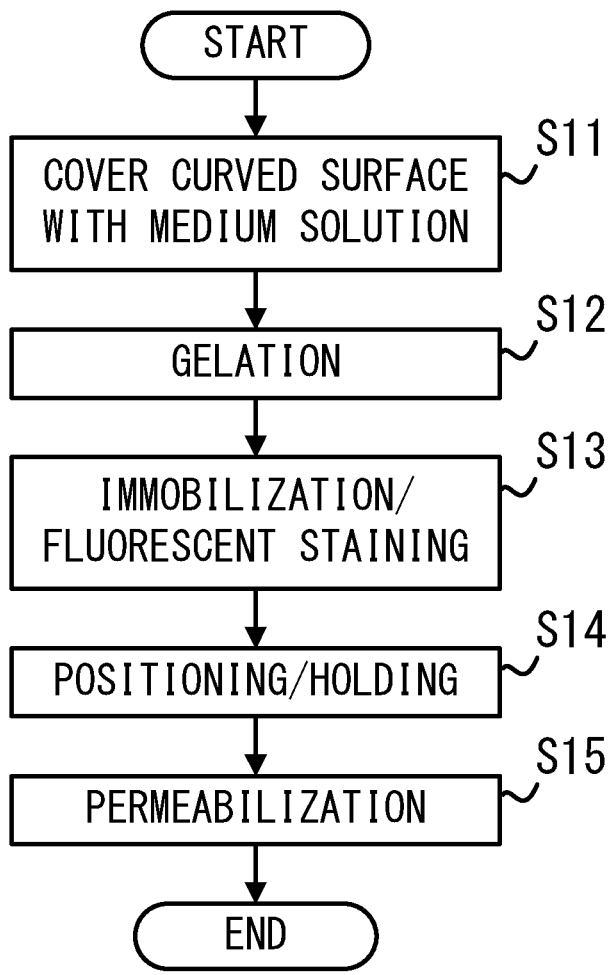
FIG. 11 is a flowchart illustrating a sample preparation method according to the second embodiment.
Figure 12:
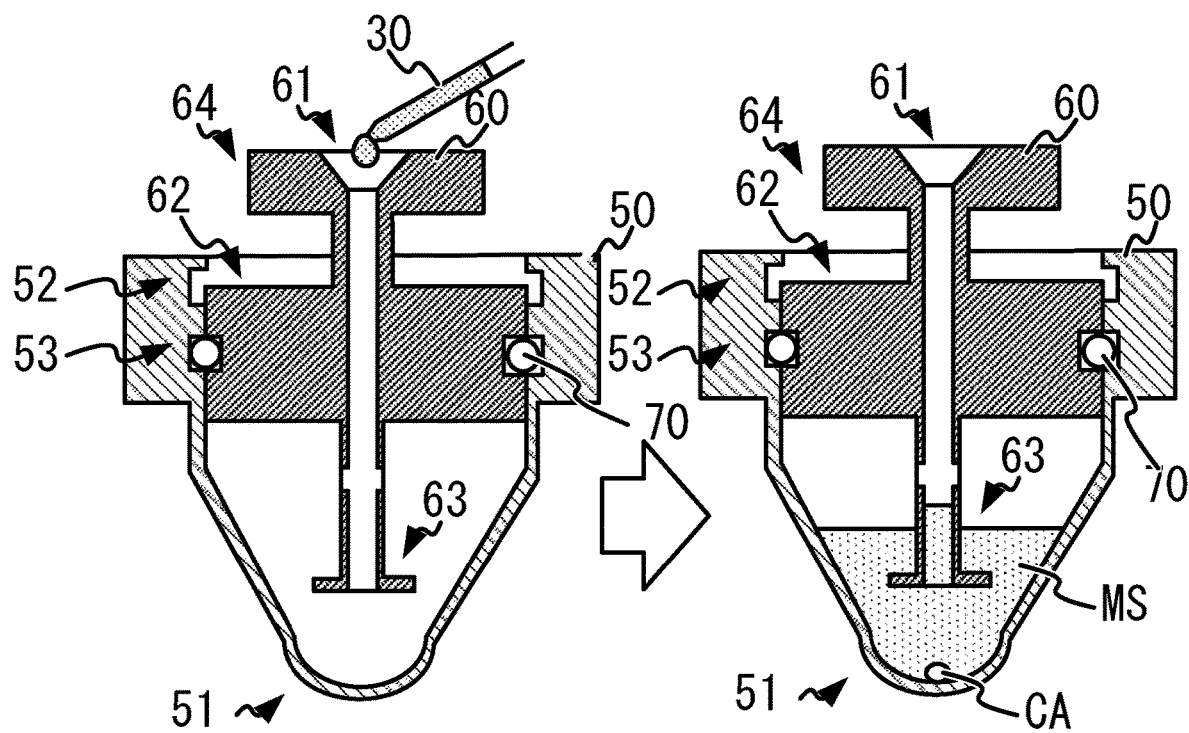
FIG. 12 is a view illustrating a process of covering a curved surface with a medium solution according to the second embodiment.
Figure 13:
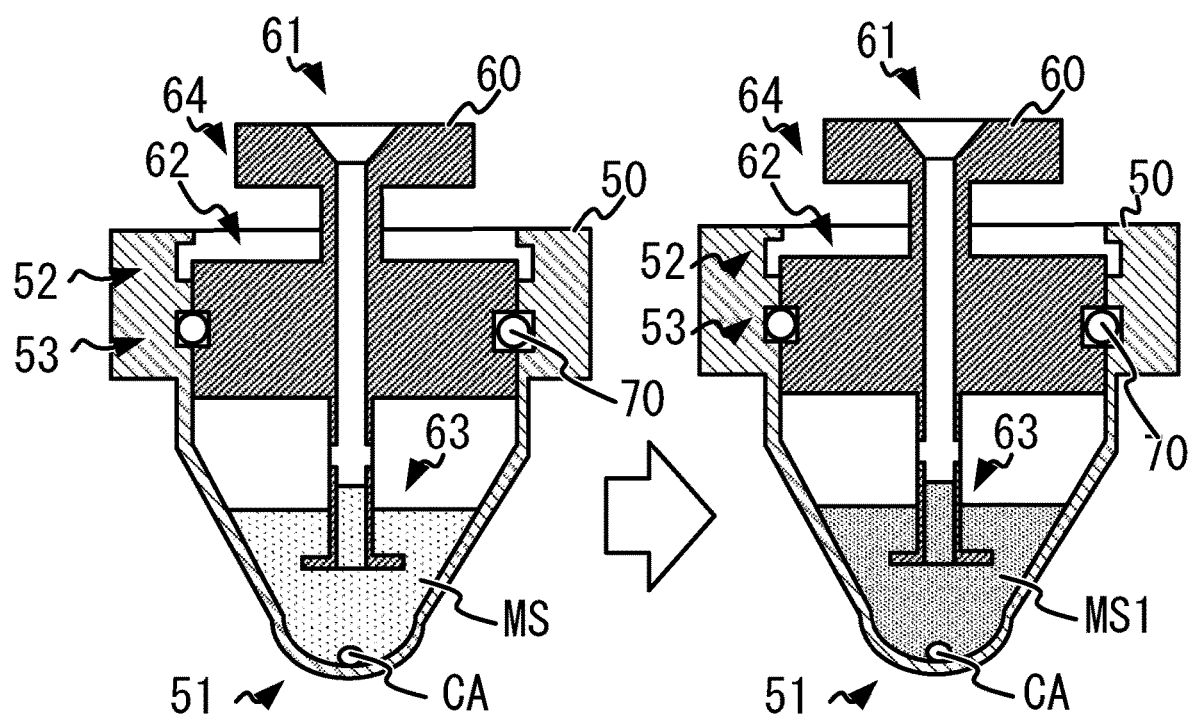
FIG. 13 is a view illustrating a gelation process according to the second embodiment.
Figure 15:
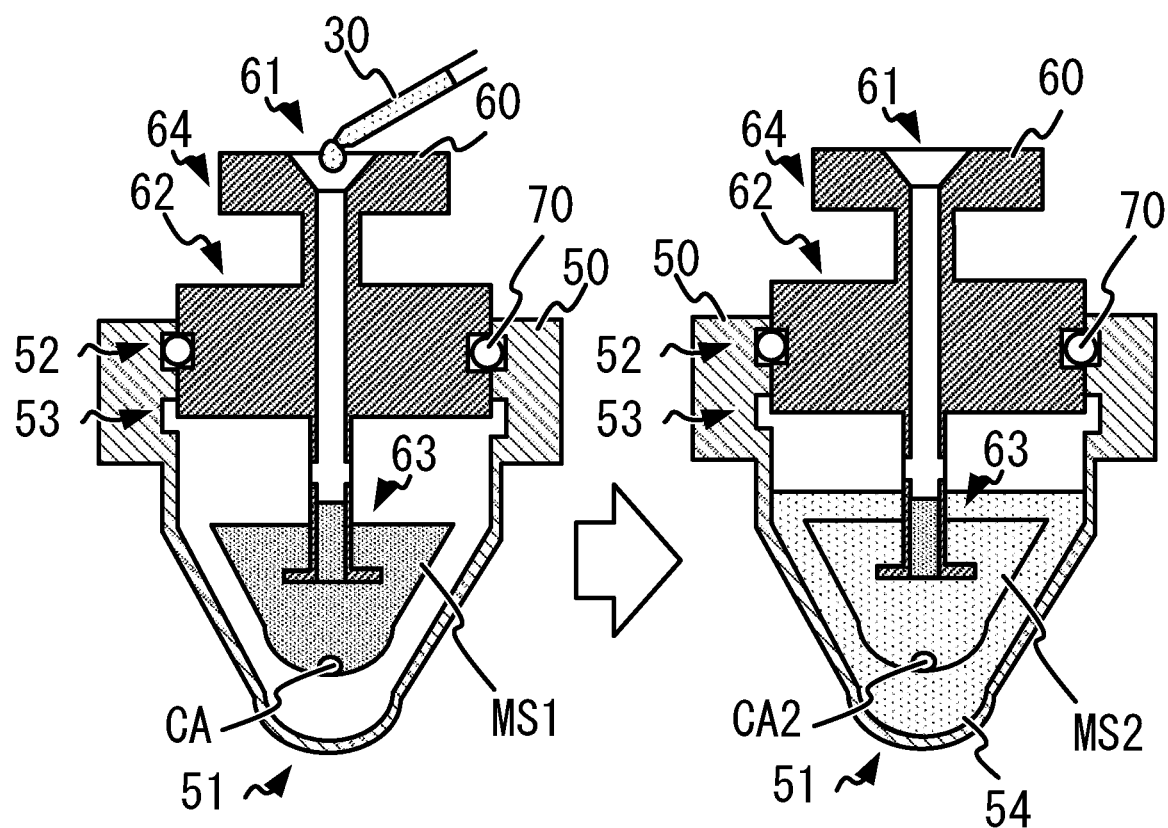
FIG. 15 is a view illustrating from a positioning/holding process to a permeabilization process according to the second embodiment.

FIG. 11 is a flowchart illustrating a sample preparation method according to the present embodiment. FIG. 12 is a view illustrating a process of covering the curved surface with the medium solution according to the present embodiment. FIG. 13 is a view illustrating a gelation process according to the present embodiment. FIG. 14 is a view illustrating a peeling process according to the present embodiment. FIG. 15 is a view illustrating from a positioning/holding process to a permeabilization process according to the present embodiment. With reference to FIGS. 11 to 15, a sample preparation method using the observation vessel 2 will be described below.

First, the curved surface 51 is covered with the medium solution containing the cell aggregate CA poured into the accommodation portion 50 through the holding portion 60 (step S11). As shown in FIG. 12, in a state where the O-ring 70 engages with the locking portion 53 and thus the holding portion 60 is positioned at a second position by the accommodation portion 50 (referred to as a second state), a medium solution MS containing the cell aggregate CA is pipetted from the opening 61 to the holding portion 60 by a pipette 30. As a result, the medium solution MS is poured into the accommodation portion 50 through the duct penetrating the holding portion 60, and is accommodated in the accommodation portion 50. Thereby, the curved surface 51 is covered with the medium solution MS. The medium solution MS to be pipetted is, for example, an acrylamide solution or an agarose solution as in the first embodiment.

The cell aggregate CA pipetted with the medium solution MS in step S11 has a higher specific gravity than the medium solution MS. In step S11, therefore, the cell aggregate CA automatically moves to a predetermined relative position with respect to the holding portion 60, more specifically, to a lowermost point of the curved surface 51, due to a component force of gravity acting along the curved surface 51 of the accommodation portion 50, as shown in FIG. 12.

When the cell aggregate CA settles at the lowermost point, the medium solution MS is gelled (step S12). Here, when the medium solution MS is an acrylamide solution or an agarose solution, the medium solution MS is cooled to a gelation temperature or lower. Thus, as shown in FIG. 13, a gel MS1 in which the medium solution MS is gelled is obtained, and the holding portion 60 holds the cell aggregate CA embedded in the gel MS1 on the curved surface 51 in the second state of being positioned at the second position by the accommodation portion 50. The gel MS1 is a gel formed by gelation of the medium solution MS and the gel in which the cell aggregate CA is embedded.

Next, immobilization and fluorescent staining of the cell aggregate CA are performed (step S13). Here, when a machine or a human grips and lifts the grip portion 64, the holding portion 60 slides in the accommodation portion 50. In step S13, the gel MS1 has lost its fluidity. For this reason, as the holding portion 60 moves, the gel MS1 is lifted by the arm portion 63. Thereby, as shown in FIG. 14, the holding portion 60 is removed from the accommodation portion 50 after peeling the gel MS1 from the curved surface 51. In other words, the holding portion 60 also serves as a peeling portion that peels the gel MS1 from the curved surface 51 by sliding in the accommodation portion 50. Then, the gel MS1 suspended from the holding portion 60 removed from the accommodation portion 50 is immersed in a solution prepared in advance, and thus the cell aggregate CA contained in the gel MS1 is fixed and stained with a fluorochrome. Further, in step S13, washing of the cell aggregate CA may be performed.

Thereafter, the holding portion 60 is positioned at the first position to hold the cell aggregate CA at a set position (step S14). Here, the holding portion 60 is inserted into the accommodation portion 50 again, and thus the O-ring 70 engages with the locking portion 52 as shown in FIG. 15. Thus, the holding portion 60 is positioned at the first position by the accommodation portion 50, and the holding portion 60 holds, in a first state of being positioned at the first position, the cell aggregate CA at a set position separated from the curved surface 51 toward a center of curvature of the curved surface 51. More specifically, the holding portion 60 suspends the gel MS1, in which the cell aggregate CA is embedded, in an accommodation space of the accommodation portion 50, and thus holding the cell aggregate CA at the set position.

The set position is at or near the center of curvature of the curved surface 51. The accommodation portion 50 and the holding portion 60 are designed in advance such that the lowermost point of the gel MS1 is located near the center of curvature of the curved surface 51 in the first state where the holding portion 60 is positioned by the accommodation portion 50.

Finally, the cell aggregate CA in the gel MS1 is cleared (step S15). Here, as shown in FIG. 15, a permeabilization solution 54 is pipetted from the opening 61 to the holding portion 60 by the pipette 30. The permeabilization solution 54 permeates into the gel MS1 from a lower end of the arm portion 63, overflows from the opening provided in the middle of the arm portion 63, and is poured into the accommodation portion 50. As a result, the permeabilization solution 54 permeates into the gel MS1 from its surroundings. Thereby, the cell aggregate CA is permeabilized, and the gel MS1 and the cell aggregate CA change into a gel MS2 and a cell aggregate CA2. As described above, a sample is completely formed in the accommodation portion 50, the sample having a substantially uniform refractive index of the media (the permeabilization solution 54, the gel MS2, and the cell aggregate CA2).

Figure 16:
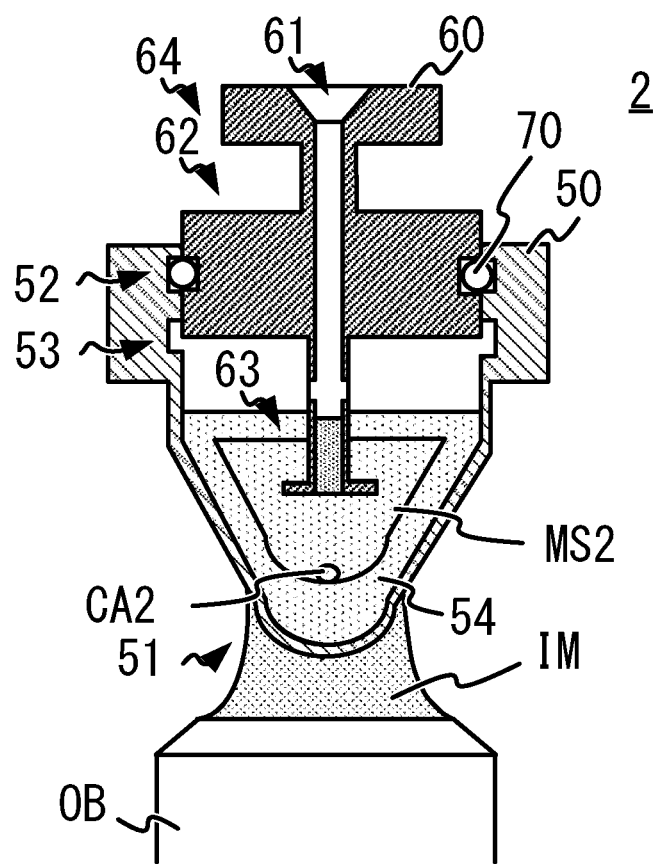
FIG. 16 is a view illustrating an observation method using the observation vessel 2 according to the second embodiment.

FIG. 16 is a view illustrating an observation method using the observation vessel 2 according to the present embodiment. At the time of observation of the cell aggregate CA2 using the sample prepared by the procedure shown in FIG. 11, an inverted microscope is used. A specific observation procedure is the same as that of the first embodiment. As shown in FIG. 16, in the state where the space between the objective lens OB and the observation vessel 2 is filled with an immersion liquid IM, light is taken in the objective lens OB via the curved surface 51 from the cell aggregate CA2 which is held at the set position, and thus the cell aggregate CA2 is observed via the curved surface 51.

Also in the present embodiment, for the same reason as in the first embodiment, it is possible to make the incident angle of light rays from the cell aggregate CA2 to the accommodation portion 50 (curved surface 51) smaller at the time of observation and thus to make a refractive angle at the accommodation portion 50 smaller. As a result, it is possible to prevent spherical aberration caused by refractive index mismatching between the media (the immersion liquid IM and the permeabilization solution) arranged with the accommodation portion 50 interposed therebetween, and to prevent deterioration of optical performance of the observation device (inverted microscope) caused by the refractive index mismatching. Accordingly, according to the observation vessel 2 and the sample preparation method of the present embodiment, it is also possible to sufficiently exhibit performance of the observation device and to acquire an image with high resolution as in the observation vessel 1 and the sample preparation method according to the first embodiment. Further, the spherical aberration can be prevented, it is possible to efficiently collect light using an objective lens sensitive to the spherical aberration and having a high numerical aperture and to obtain an image in a short time.

Further, since the spherical aberration caused by the refractive index mismatching can be made smaller, the immersion liquid IM can be freely selected, which is the same as the first embodiment. The observation vessel 2 and the sample preparation method according to the present embodiment are also suitable for automation of work and are used for usage for inspecting a large quantity of samples, for example, drug discovery screening, thereby high throughput can be realized.

In the present embodiment, when it is not necessary to waste the solution used for the immobilization or the fluorescent staining, a series of procedures can be efficiently performed without removing the holding portion 60 from the accommodation portion 50. In other words, the holding portion 60 may be positioned at the first position immediately after the gel is peeled off, and the immobilization or the fluorescent staining may be performed by injection of the solution used for the immobilization or the fluorescent staining in the first state. Then, a permeation process may be further performed by addition of a permeabilization solution.

In the step S11 of the present embodiment, the medium solution is pipetted in the state where the holding portion 60 is positioned at the second position by the accommodation portion 50, but the medium solution may be pipetted in a state where the holding portion 60 is removed from the accommodation portion 50. In this case, the holding portion 60 is inserted into the accommodation portion 50 until step S12, and thus the holding portion 60 may be positioned at the second position by the accommodation portion 50.

In step S14 of the present embodiment, an example is described in which the holding portion 60 is positioned by the accommodation portion 50 in a state where the accommodation portion 50 is not filled with the permeabilization solution 54 and then the permeabilization solution 54 is pipetted, but the holding portion 60 is positioned by the accommodation portion 50 in a state where the accommodation portion 50 is filled with the permeabilization solution 54.

The present embodiment described the method of gelling the medium solution, but is similar to the first embodiment in that the medium solution is irradiated with ultraviolet rays using an ultraviolet curable resin solution as the medium solution and thus the medium solution may be solidified. Even when the solid formed by solidification of the medium solution is immersed into the solution, the solution is not impregnated into the solid, unlike the case of the gel. Therefore, when the ultraviolet curable resin solution is used, it is desirable to previously perform a treatment such as fluorescent staining on the cell aggregate.

Third Embodiment

FIG. 17 is a view showing a configuration of an observation vessel 3 according to the present embodiment. As shown in FIG. 17, the observation vessel 3 is different from the observation vessel 1 in that the holding portion 20 is not provided and an absorbent polymer P is used instead at the time of observation. The absorbent polymer P has a recess, and is arranged on a curved surface 11 by being charged into an accommodation portion 10 with the recess facing upward. The absorbent polymer P expands due to water absorption as will be described below, and as a result, forms a transparent layer on the curved surface 11, thereby functioning as a holding portion. In other words, the holding portion of the observation vessel 3 is formed by water absorption and expansion of the absorbent polymer arranged on the accommodation portion 10.

Figure 18:
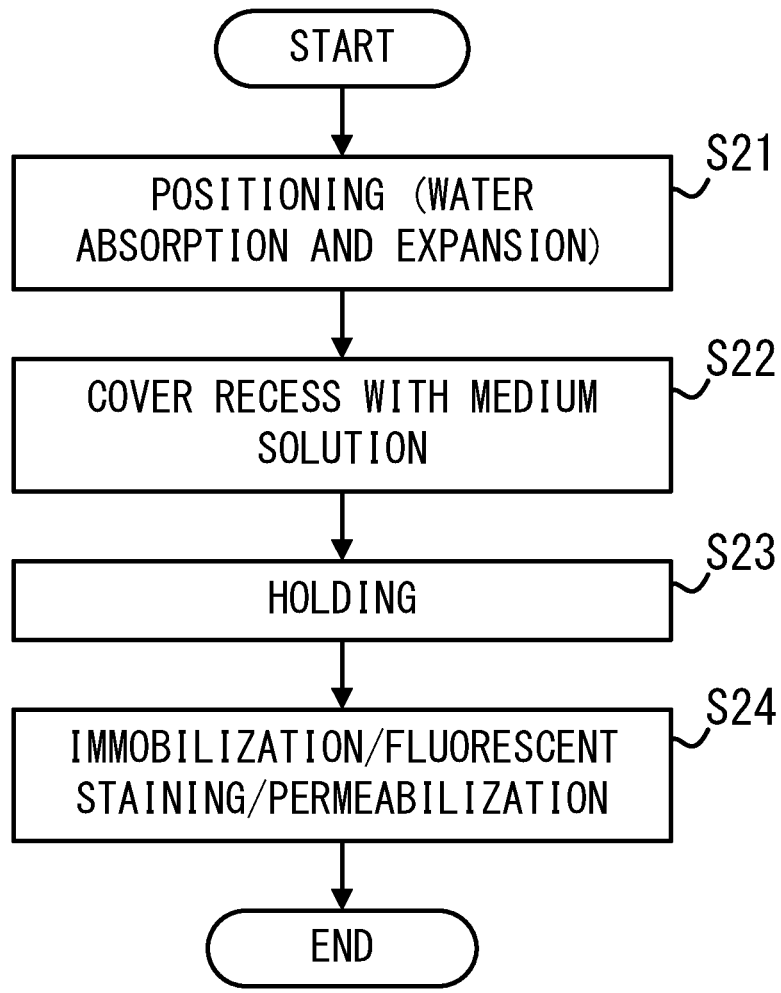
FIG. 18 is a flowchart illustrating a sample preparation method according to the third embodiment.
Figure 19:
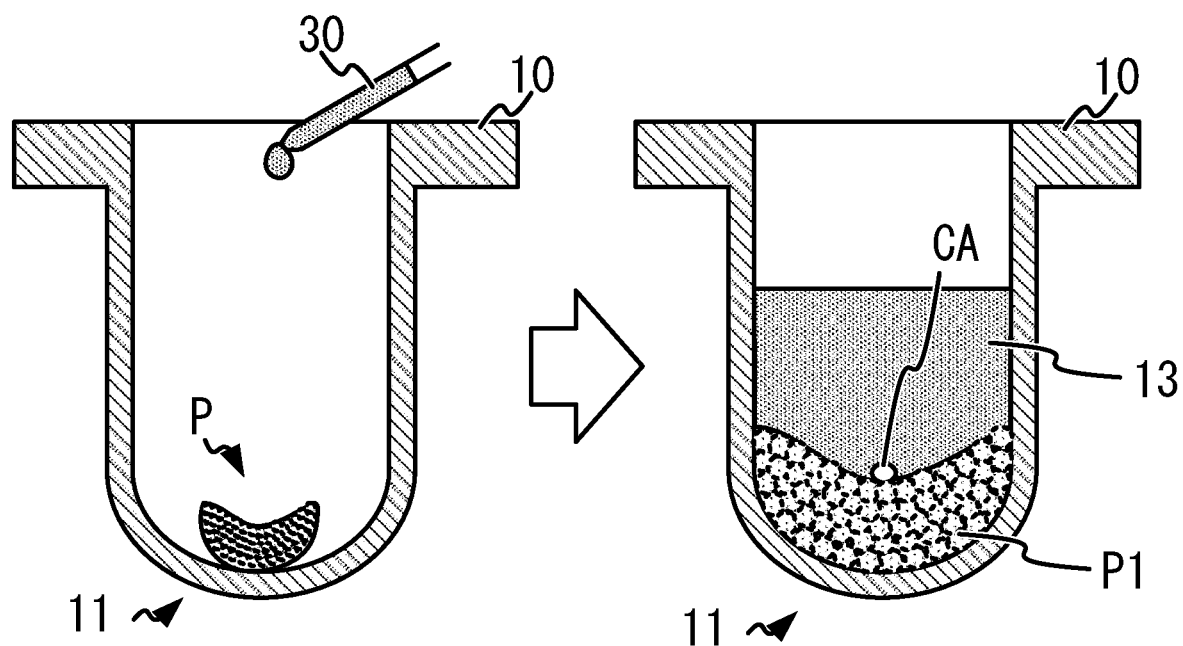
FIG. 19 is a view illustrating from a positioning process to a holding process according to the third embodiment.
Figure 20:
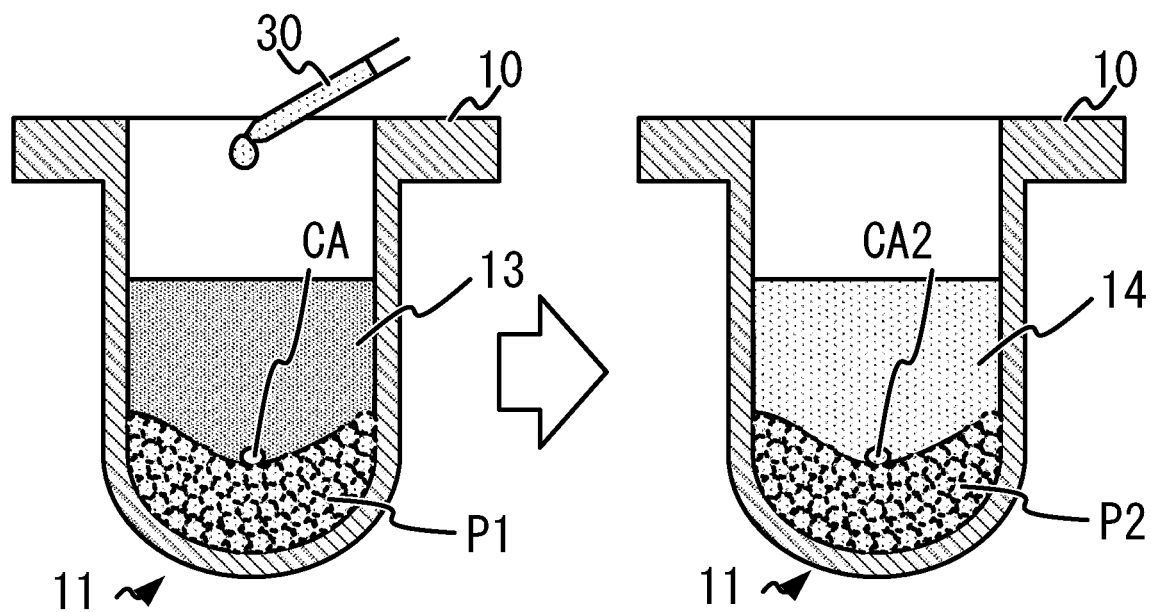
FIG. 20 is a view illustrating a permeabilization process according to the third embodiment.

FIG. 18 is a flowchart illustrating a sample preparation method according to the present embodiment. FIG. 19 is a view illustrating a positioning process according to the present embodiment. FIG. 20 is a view illustrating a permeabilization process according to the present embodiment. With reference to FIGS. 18 to 20, a sample preparation method using the observation vessel 3 will be described below.

First, the absorbent polymer P arranged in the accommodation portion 10 absorbs water and expands (step S21). Here, a culture solution 13 is pipetted into the accommodation portion 10 using a pipette 30. Thereby, the absorbent polymer P absorbing culture solution 13 expands, and a holding portion P1 having a recess in a center is formed on the curved surface 11 with the recess facing vertically upward. The holding portion P1 has a shape similar to that of the absorbent polymer P, but is deformed due to the action of gravity so as to come into contact with the curved surface 11 without a gap. In step S21, a position of the holding portion P1 is determined with respect to the accommodation portion 10. For this reason, this process can be regarded as a process in which the holding portion P1 is positioned at the first position by the accommodation portion 10.

Next, the recess of the holding portion P1 is covered with a medium solution containing an observation object in the accommodation portion 10 (step S22) to hold the observation object in the recess (step S23). The medium solution is, for example, the culture solution 13, and the observation object is a cell seeded in the culture solution 13. Here, the culture solution 13 is pipetted into the accommodation portion 10 in excess of the amount of the absorbent polymer P that can absorb water, and the holding portion P1 is filled with the culture solution 13. At this time, cells having a larger specific gravity than that of the culture solution 13 gather in the recess of the holding portion P1 by seeding of cells in the culture solution 13. The cells are cultured in this state, and thus a cell aggregate CA is formed in the recess and the cell aggregate CA is held in the recess as shown in FIG. 19.

A bottom of the recess is at or near a center of curvature of the curved surface 11. The accommodation portion 10 and the holding portion P1 are designed in advance such that the bottom of the recess is located near the center of curvature of the curved surface 11 in the first state where the holding portion P1 is positioned by the accommodation portion 10. In other words, the bottom of the recess corresponds to the set position in the first and second embodiments described above.

Finally, immobilization, fluorescent staining, and permeabilization of the cell aggregate CA are performed (step S24). Here, first, the culture solution 13 is extracted, and then a solution 14 used for immobilization, fluorescent staining, and permeabilization is pipetted into the accommodation portion 10 by the pipette 30 as shown in FIG. 20. Thus, the solution 14 permeates the holding portion P1. Further, the cell aggregate CA is immobilized and stained with a fluorochrome, and the cell aggregate CA is permeabilized. As described above, a sample is completely formed in the accommodation portion 10, the sample having a substantially uniform refractive index of the media (holding portion P2 in which the solution 14 permeates, solution 14, and cell aggregate CA2).

Figure 21:
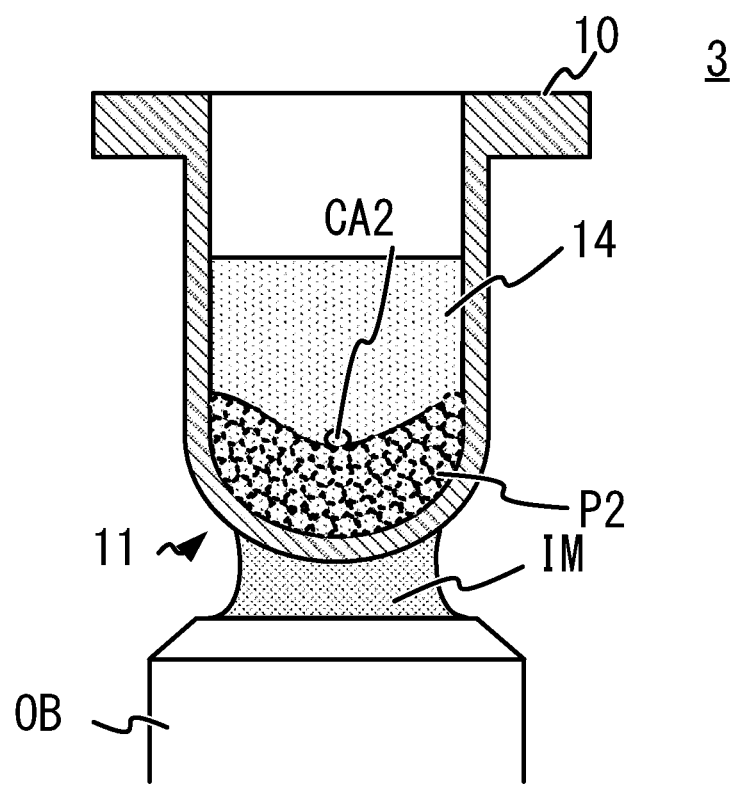
FIG. 21 is a view illustrating an observation method using the observation vessel 3 according to the third embodiment.

FIG. 21 is a view illustrating an observation method using the observation vessel 3 according to the present embodiment. At the time of observation of the cell aggregate CA2 using the sample prepared by the procedure shown in FIG. 18, an inverted microscope is used. A specific observation procedure is the same as that of the first and second embodiments. As shown in FIG. 21, in the state where the space between an objective lens OB and the observation vessel 3 is filled with an immersion liquid IM, light is taken in the objective lens OB via the curved surface 11 from the cell aggregate CA2 which is held at the set position (the recess), and thus the cell aggregate CA2 is observed via the curved surface 11.

Also in the present embodiment, for the same reason as in the first and second embodiments, it is possible to prevent deterioration of optical performance of the observation device (inverted microscope) caused by refractive index mismatching. Therefore, the observation vessel 3 and the sample preparation method according to the present embodiment can also sufficiently exhibit the performance of the observation device and can acquire a high-resolution image in a short time. Further, since the spherical aberration caused by the refractive index mismatching can be made smaller, the immersion liquid IM can be freely selected, which is the same as the first and second embodiments. The observation vessel 3 and the sample preparation method according to the present embodiment are also suitable for automation of work and are used for usage for inspecting a large quantity of samples, for example, drug discovery screening, thereby high throughput can be realized.

Fourth Embodiment

Figure 22:
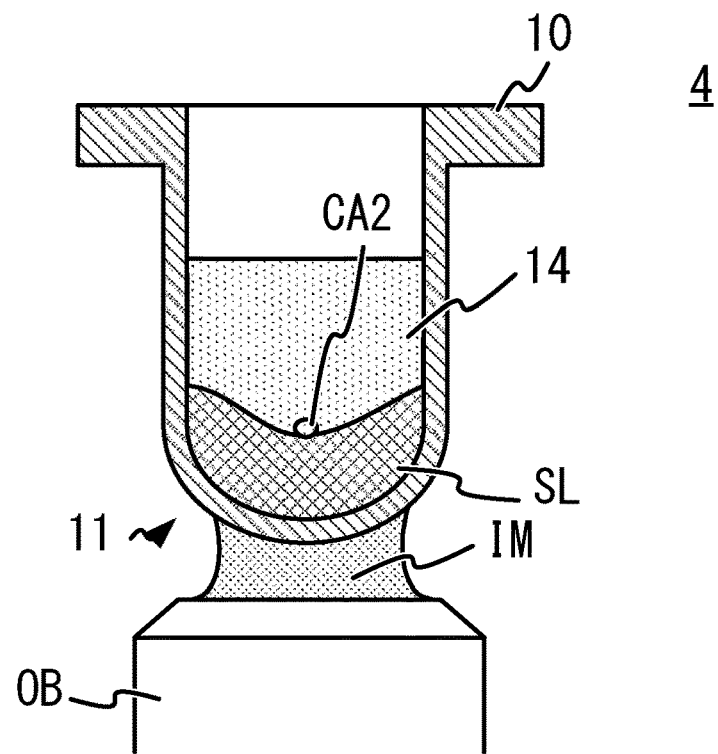
FIG. 22 is a view illustrating an observation method using an observation vessel 4 according to a fourth embodiment.

FIG. 22 is a view illustrating an observation method using an observation vessel 4 according to the present embodiment. The observation vessel 4 is different from the observation vessel 3 in that silicone rubber SL formed with a recess for holding an observation object is provided instead of the holding portion P2 provided by expansion of the absorbent polymer P. As shown in FIG. 22, the silicone rubber SL is arranged on a curved surface 11 with the recess facing vertically upward. The silicone rubber SL has a refractive index of about 1.41, and a permeabilization solution having the same refractive index as that of the silicone rubber exists. Therefore, when a solution 14 uses a solution having a refractive index similar to that of the silicone rubber SL, refraction between the silicone rubber SL and the solution 14 can be avoided.

The same effect as that of the observation vessel 3 and the sample preparation method according to the third embodiment can also be obtained by the observation vessel 4 and the sample preparation method according to the present embodiment.

Fifth Embodiment

Figure 24:
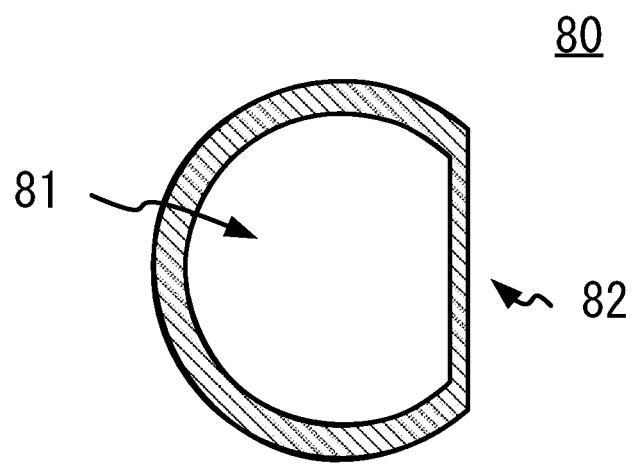
FIG. 24 is a view illustrating a shape of an accommodation portion 80.

FIG. 23 is a view showing a configuration of an observation vessel 5 according to the present embodiment. FIG. 24 is a view illustrating a shape of an accommodation portion 80. The observation vessel 5 shown in FIG. 23 is different from the observation vessel 1 in that the accommodation portion 80 is provided instead of the accommodation portion 10. The observation vessel 5 is similar to the observation vessel 1 in other regards.

The accommodation portion 80 is similar to the accommodation portion 10 of the observation vessel 1 in that at least a part thereof is formed of a transparent curved surface (curved surface 81). As shown in FIGS. 23 and 24, the accommodation portion 80 is different from the accommodation portion 10 in that at least a part thereof is formed of a transparent flat surface (flat surface 82). FIG. 24 is a cross-sectional view taken along a line S-S shown in FIG. 23.

Both the curved surface 81 and the flat surface 82 have a substantially uniform thickness. In addition, the flat surface 82 is a flat surface being parallel in a vertical direction when the observation vessel 5 is used. Further, the flat surface 82 is formed at a position where a cell aggregate CA2 held by the holding portion 20 can be irradiated with a light sheet incident in a direction orthogonal to the flat surface 82. Further, the flat surface 82 is formed such that a plane parallel to the flat surface 82 and including a set position intersects the curved surface 81.

Even when the observation vessel 5 shown in FIG. 23 is used, it is possible to prepare a sample having a substantially uniform refractive index of media (permeabilization solution 12, cell aggregate CA2) is prepared by the same procedure (the procedure shown in FIG. 3) as when the observation vessel 1 is used.

Figure 25:
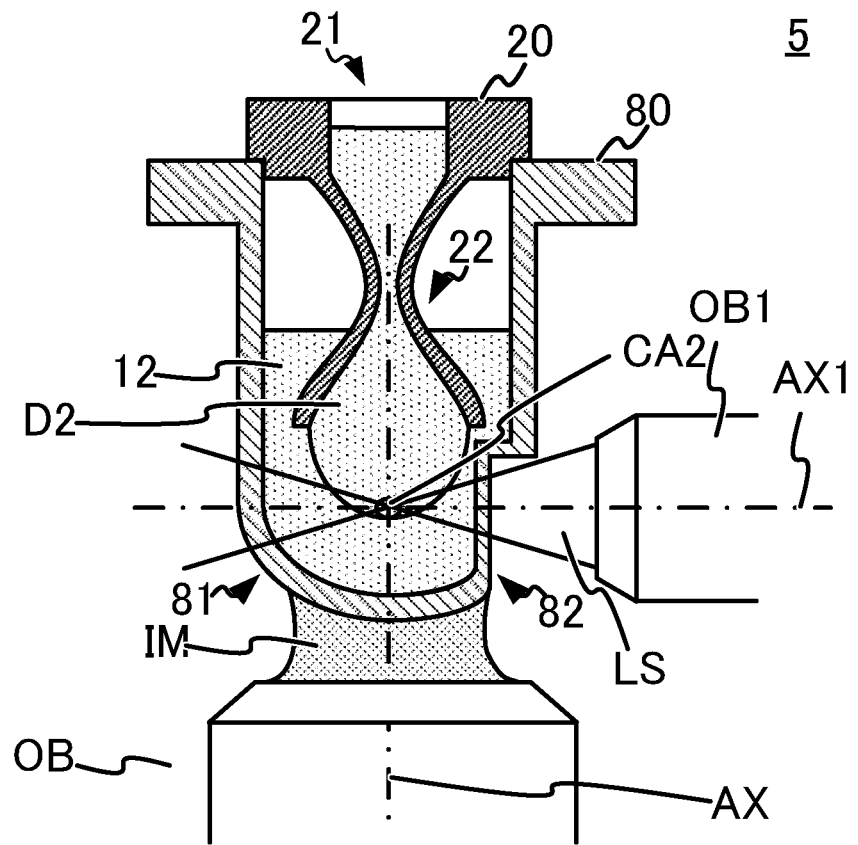
FIG. 25 is a view illustrating an observation method using the observation vessel 5 according to the fifth embodiment.

FIG. 25 is a view illustrating an observation method using the observation vessel 5 according to the present embodiment. A light sheet microscope is used at the time of observing the cell aggregate CA2 using the observation vessel 5. Specifically, as shown in FIG. 25, the cell aggregate CA2 is irradiated with a light sheet via the flat surface 82 from an objective lens OB1 for illumination in a state where a space between the objective lens OB for observation of the light sheet microscope and the curved surface 81 of the observation vessel 5 is filled with an immersion liquid IM. Then, the objective lens OB takes in a fluorescence generated from the cell aggregate CA2, via the curved surface 81, and the cell aggregate CA2 is observed. An optical axis AX of the objective lens OB for observation is oriented in a vertical direction, and is orthogonal to an optical axis AX1 of the objective lens OB1 for illumination.

Also in the present embodiment, for the same reason as in the first to fourth embodiments, it is possible to prevent deterioration of optical performance of the observation device (inverted microscope) caused by refractive index mismatching. Therefore, the observation vessel 5 and the sample preparation method according to the present embodiment can also sufficiently exhibit the performance of the observation device and can acquire a high-resolution image. Further, spherical aberration can be prevented, it is possible to efficiently collect light using an objective lens sensitive to the spherical aberration and having a high numerical aperture and to obtain an image in a short time. Further, since the spherical aberration caused by the refractive index mismatching can be made smaller, the immersion liquid IM can be freely selected, which is the same as the first to fourth embodiments. The observation vessel 5 and the sample preparation method according to the present embodiment are also suitable for automation of work and are used for usage for inspecting a large quantity of samples, for example, drug discovery screening, thereby high throughput can be realized.

In the present embodiment, the flat surface 82 is formed on the accommodation portion 80. By incidence of the light sheet from the flat surface 82, it is possible to avoid that a light collecting position of light rays constituting the light sheet in a traveling direction of illumination light is different in a width direction. Therefore, it is possible to prevent deterioration of illumination performance due to the illumination of the cell aggregate CA2 via the accommodation portion 80.

Sixth Embodiment

Figure 26:
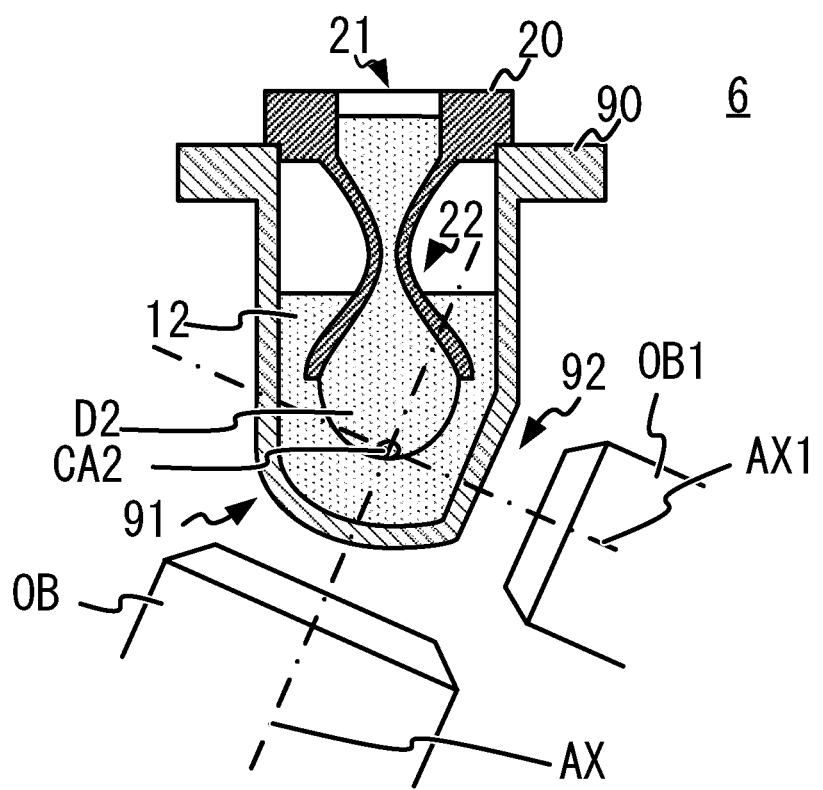
FIG. 26 is a view illustrating an observation method using an observation vessel 6 according to a sixth embodiment.

FIG. 26 is a view illustrating an observation method using an observation vessel 6 according to the present embodiment. The observation vessel 6 shown in FIG. 26 is different from the observation vessel 5 in that an accommodation portion 90 is provided instead of the accommodation portion 80. The observation vessel 6 is similar to the observation vessel 5 in other regards.

The accommodation portion 90 is similar to the accommodation portion 80 of the observation vessel 5 in that at least a part thereof is formed of a transparent curved surface (curved surface 91) and at least a part thereof is formed of a transparent flat surface (flat surface 92). The accommodation portion 80 is formed with the flat surface 82 assuming that the light sheet is incident in a horizontal direction, whereas the accommodation portion 90 is formed with the flat surface 92 inclined in a vertical direction assuming that the light sheet is incident diagonally downward as shown in FIG. 26. In this regard, the accommodation portion 90 is different from the accommodation portion 80. However, the accommodation portion 90 is similar to the accommodation portion 80 in that the flat surface 92 is formed such that a plane parallel to the flat surface 92 and including a set position intersects the curved surface 91.

A light sheet microscope is used as in the fifth embodiment at the time of observing the cell aggregate CA2 using the observation vessel 6. Specifically, as shown in FIG. 26, the cell aggregate CA2 is irradiated with the light sheet via the flat surface 92 from the objective lens OB1 for illumination. Then, the objective lens OB takes in a fluorescence generated from the cell aggregate CA2, via the curved surface 91, and the cell aggregate CA2 is observed. This is the same as the fifth embodiment except that an orientation of the optical axis AX1 of the objective lens OB1 and an orientation of the optical axis AX of the objective lens OB are adjusted according to an orientation of the flat surface 92. Specifically, for example, the optical axis AX1 is formed with an angle of 30° in the horizontal direction, and the optical axis AX is formed with an angle of 60° in the horizontal direction.

The same effect as that of the observation vessel 5 and the sample preparation method according to the fifth embodiment can also be obtained by the observation vessel 6 and the sample preparation method according to the present embodiment.

Seventh Embodiment

Figure 27:
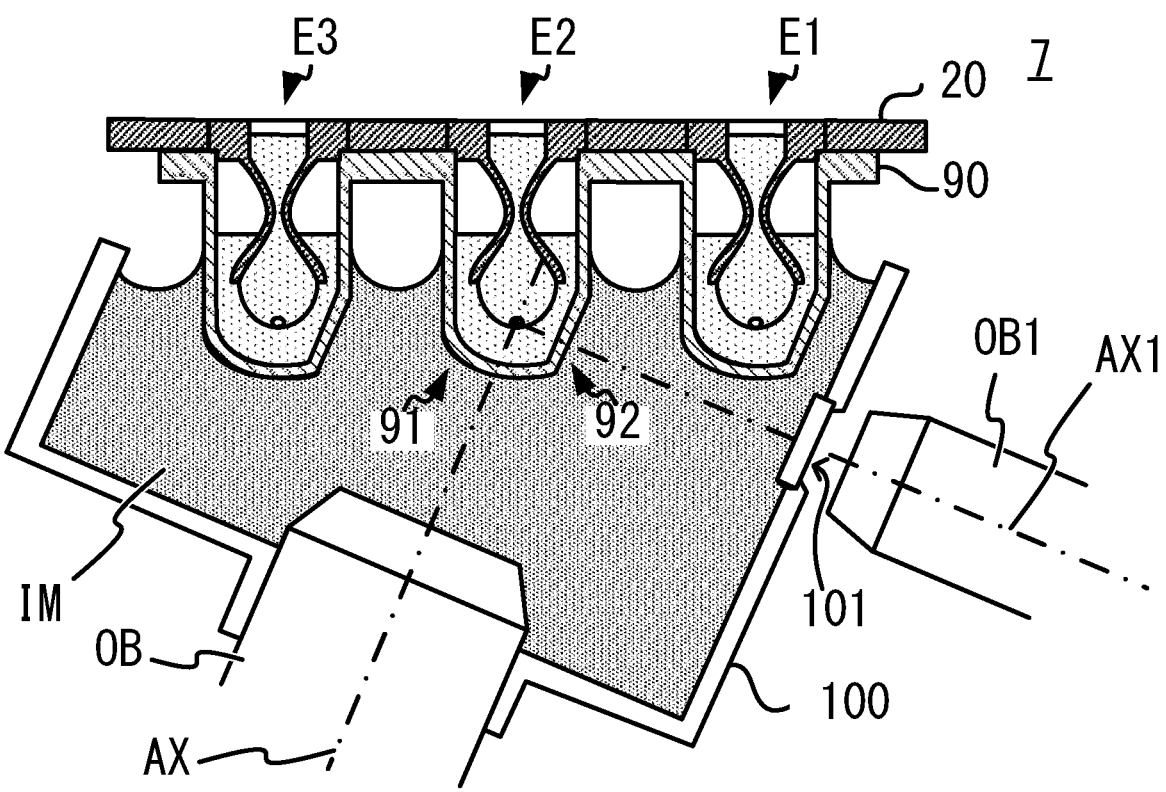
FIG. 27 is a view illustrating an observation method using an observation vessel 7 according to a seventh embodiment.

FIG. 27 is a view illustrating an observation method using an observation vessel 7 according to the present embodiment. The observation vessel 7 shown in FIG. 27 is different from the observation vessel 6 in that multi-well plates are provided and include a plurality of elements (elements E1, E2, E3, . . . ) corresponding to the observation vessel 6 according to the sixth embodiment, respectively. In other words, each of the elements includes a holding portion 20 and an accommodation portion 90. The observation vessel 7 is similar to the observation vessel 6 in other regards. The plurality of elements are arranged one-dimensionally or two-dimensionally.

A light sheet microscope is used as in the sixth embodiment at the time of observing a cell aggregate CA2 using the observation vessel 7. As shown in FIG. 27, an immersion-liquid holder 100 is attached to an objective lens OB for observation of a light sheet microscope. Water, which is an immersion liquid IM, is supplied to the immersion-liquid holder 100 by a water supply device (not shown), and thus the water is stored in the immersion-liquid holder 100. Thus, a space between the objective lens OB for observation and a curved surface 91 of the observation vessel 7 is also filled with water. Further, the immersion-liquid holder 100 is provided with a window 101. The window 101 is formed of a transparent flat plate substantially parallel to a flat surface 92. Light emitted from an objective lens OB1 for illumination is incident into the observation vessel 7 via the window 101 and the flat surface 92 to form a light sheet, and the cell aggregate CA2 is irradiated with the light sheet. The objective lens OB takes in a fluorescence generated from the cell aggregate CA2, via the curved surface 91, and the cell aggregate CA2 can be observed.

The same effect as that of the observation vessel 6 and the sample preparation method according to the sixth embodiment can also be obtained by the observation vessel 7 and the sample preparation method according to the present embodiment. In general, when the multi-well plate is used in the light sheet microscope, it is difficult to make the light sheet incident in the horizontal direction in which wells are aligned. However, when the light sheet is incident in a direction inclined with respect to the horizontal direction, the light sheet is refracted in the observation vessel designed assuming that the light sheet is incident in the horizontal direction as in the observation vessel 5 according to the fifth embodiment. On the other hand, in the observation vessel 7 according to the present embodiment, the respective elements forming the multi-well plates are designed in advance assuming that the light sheet is incident from diagonally below. Therefore, since the light sheet can be illuminated via the flat surface 92 without being refracted such that a light collecting position in a traveling direction of illumination light does not differ in a width direction of the light sheet, the observation can be excellently performed.

Accordingly, the observation vessel 7, which is the multi-well plate, is conveyed by a conveyance device (not shown), and the respective elements of the observation vessel 7 are sequentially arranged on an optical axis (an optical axis AX or an optical axis AX1), thereby the observation object can be observed using the light sheet microscope. Thus, a large quantity of observation objects can be efficiently observed.

The above-described embodiments are specific examples that are intended to facilitate the understanding of the invention, but the invention is not limited to these embodiments. The observation vessel, the sample preparation method, and the observation method can be variously modified and changed without departing from the description of claims.

In the above-described embodiments, an example is described in which the observation vessel for light sheet microscope including the flat surface formed at least partially includes the holding portion 20 configured to form the hanging drop, but the configuration of the holding portion is not limited to such an example. As in the observation vessel 2, the observation vessel for light sheet microscope including the flat surface formed at least partially may include an accommodation portion using as a mold and a holding portion functioning as a peeling portion, and the flat surface described above may be configured as a part of the mold.

What is claimed is:

1. An observation vessel comprising:
a holding portion configured to hold an observation object; and
an accommodation portion that is at least partially formed of a bottom having a transparent three-dimensional curved surface and is configured to position the holding portion,
wherein the holding portion is configured to hold the observation object at a set position separated from the three-dimensional curved surface toward a center of curvature of the three-dimensional curved surface inside the accommodation portion in a first state of being positioned at a first position by the accommodation portion, and
wherein the observation vessel is configured to guide light from the observation object held at the set position into an objective lens positioned below the bottom of the accommodation portion via the three-dimensional curved surface,
wherein the three-dimensional curved surface and a positional relationship between the set position and the three-dimensional curved surface suppresses spherical aberration caused by refractive index mismatching between the observation vessel and a medium in the observation vessel or between the medium in the observation vessel and an immersion liquid between the observation vessel and the objective lens.

2. The observation vessel according to claim 1, wherein the holding portion is configured to hold, in the first state, the observation object at the set position by suspending a gel or a solid in which the observation object is embedded.

3. The observation vessel according to claim 2, wherein the holding portion includes a hanging drop forming portion configured to form a hanging drop of a medium solution containing the observation object,
the hanging drop contains the observation object that moves to a predetermined relative position with respect to the holding portion due to a component force of gravity acting along a liquid surface, and
the gel or the solid is formed by gelation or solidification of the hanging drop.

4. The observation vessel according to claim 2, wherein the gel or the solid is a medium solution accommodated in the accommodation portion, and is formed by gelation or solidification of a medium solution containing the observation object that moves to a predetermined relative position with respect to the holding portion due to a component force of gravity acting along the curved surface, and the holding portion further serves as a peeling portion configured to peel the gel or the solid from the curved surface by sliding in the accommodation portion.

5. The observation vessel according to claim 4, wherein the accommodation portion includes:

a first locking portion configured to position the holding portion at the first position; and a second locking portion configured to position the holding portion at a second position, the holding portion being configured to hold the observation object, which is embedded in the gel or the solid, on the curved surface in a second state of being positioned at the second position by the accommodation portion.

6. The observation vessel according to claim 1, wherein the holding portion includes a recess configured to hold the observation object, and the holding portion is arranged or formed on the curved surface in a state where the recess faces vertically upward.

7. The observation vessel according to claim 6, wherein the holding portion is made of silicone rubber.

8. The observation vessel according to claim 6, wherein the holding portion is formed by an absorbent polymer arranged in the accommodation portion to absorb water and expand.

9. The observation vessel according to claim 1, wherein the accommodation portion is at least partially formed of a transparent flat surface, and the set position is located on a normal line of the flat surface.

10. The observation vessel according to claim 1, wherein the curved surface is a spherical surface.

11. The observation vessel according to claim 1, wherein the curved surface has a predetermined curvature.

12. The observation vessel according to claim 1, wherein when a distance from the curved surface to the observation object held at the set position is defined as d and a radius of curvature of the curved surface is defined as R, a following conditional expression is satisfied:

$$R/2 < d < R \qquad (1).$$

13. The observation vessel according to claim 1, wherein the observation vessel includes a plurality of elements arranged one-dimensionally or two-dimensionally, and each of the plurality of elements includes the accommodation portion and the holding portion.

14. A method using an observation vessel including a holding portion that is configured to hold an observation object, and an accommodation portion that is at least partially formed of a bottom having a transparent three-dimensional curved surface and is configured to position the holding portion, the method comprising:

positioning the holding portion at a first position by the accommodation portion;

holding the observation object at a set position separated from the three-dimensional curved surface toward a center of curvature of the three-dimensional curved surface inside the accommodation portion in a first state where the holding portion is positioned at the first position; and guiding light from the observation object held at the set position into an objective lens positioned below the bottom of the accommodation portion via the three-dimensional curved surface;

wherein the three-dimensional curved surface and a positional relationship between the set position and the three-dimensional curved surface suppresses spherical aberration caused by refractive index mismatching between the observation vessel and a medium in the observation vessel or between the medium in the observation vessel and an immersion liquid between the observation vessel and the objective lens.

15. The method according to claim 14, further comprising:

forming a hanging drop of a medium solution containing the observation object by the holding portion; and forming a gel or a solid, in which the observation object is embedded, by gelation or solidification of the hanging drop, wherein the holding the observation object at the set position in the first state includes suspending the gel or the solid in which the observation object is embedded.

16. The method according to claim 14, further comprising:

covering the curved surface with a medium solution containing the observation object poured into the accommodation portion;

forming a gel or a solid, in which the observation object is embedded, by gelation or solidification of the medium solution; and peeling the gel or the solid from the curved surface, wherein the holding the observation object at the set position in the first state includes suspending the gel or the solid in which the observation object is embedded.

17. The method according to claim 14, further comprising:

covering a recess of the holding portion positioned at the first position with a medium solution containing the observation object poured into the accommodation portion, wherein the positioning the holding portion at the first position includes arranging or forming the holding portion on the curved surface in a state where the recess faces vertically upward, and the holding the observation object at the set position in the first state includes holding the observation object in the recess.

18. The method according to claim 15, further comprising:

filling a space between the accommodation portion and the objective lens with the immersion liquid.

* * * * *